(12) United States Patent
Tsai et al.

(10) Patent No.: US 8,332,710 B2
(45) Date of Patent: Dec. 11, 2012

(54) PACKET-ASYNCHRONOUS HYBRID-ARQ

(75) Inventors: Ming-Chang Tsai, San Diego, CA (US); Gwendolyn Barriac, San Diego, CA (US); Sony John Akkarakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1061 days.

(21) Appl. No.: 12/050,072

(22) Filed: Mar. 17, 2008

(65) Prior Publication Data
US 2008/0235552 A1    Sep. 25, 2008

Related U.S. Application Data

(60) Provisional application No. 60/896,035, filed on Mar. 21, 2007.

(51) Int. Cl.
    H04L 1/18    (2006.01)
(52) U.S. Cl. .................................................. 714/749
(58) Field of Classification Search .................. 714/749
    See application file for complete search history.

(56) References Cited

U.S. PATENT DOCUMENTS

| | | | |
|---|---|---|---|
| 5,537,414 A * | 7/1996 | Takiyasu et al. | 370/347 |
| 6,484,285 B1 * | 11/2002 | Dent | 714/791 |
| 8,015,467 B2 * | 9/2011 | Kano | 714/749 |
| 2002/0057713 A1 * | 5/2002 | Bagchi et al. | 370/468 |
| 2003/0035389 A1 * | 2/2003 | Chen et al. | 370/331 |
| 2003/0072305 A1 * | 4/2003 | Odenwalder et al. | 370/389 |
| 2003/0202500 A1 * | 10/2003 | Ha et al. | 370/342 |
| 2005/0013263 A1 * | 1/2005 | Kim et al. | 370/320 |
| 2005/0022098 A1 * | 1/2005 | Vayanos et al. | 714/776 |
| 2006/0221885 A1 * | 10/2006 | Nagaraj | 370/328 |
| 2007/0047495 A1 * | 3/2007 | Ji et al. | 370/335 |
| 2007/0061664 A1 * | 3/2007 | Pan et al. | 714/748 |
| 2007/0076713 A1 * | 4/2007 | Odenwalder et al. | 370/389 |
| 2008/0209297 A1 * | 8/2008 | Chandra et al. | 714/748 |
| 2008/0267190 A1 * | 10/2008 | Baker et al. | 370/394 |
| 2011/0004808 A1 * | 1/2011 | Anandakumar et al. | 714/776 |

FOREIGN PATENT DOCUMENTS

| | | |
|---|---|---|
| EP | 1429487 A2 | 6/2004 |
| TW | 170073 | 10/1991 |
| TW | 444484 B | 7/2001 |
| TW | 518873 B | 1/2003 |
| WO | WO0230004 | 4/2002 |

OTHER PUBLICATIONS

International Search Report—PCT/US08/057939—International Search Authority, European Patent Office—Oct. 1, 2008.
Written Opinion—PCT/US08/057939—International Search Authority, European Patent Office—Oct. 1, 2008.
Fengmin, Gong et al., "An Application-Oriented Error Control Scheme for High-Speed Networks," IEEE/ACM Transactions on Networking, IEEE/ACM, New York, NY, vol. 4, No. 5, Oct. 1, 1996, pp. 669-682.
Taiwan Search Report—TW097110323—TIPO—Aug. 24, 2011.

* cited by examiner

Primary Examiner — Scott Baderman
Assistant Examiner — Neil Miles
(74) Attorney, Agent, or Firm — Howard H. Seo

(57) ABSTRACT

Aspects described a low receiver complexity approach for reliable packet decoding when Hybrid ARQ protocol is employed with persistent assignment and potentially an erasure sequence transmission. Multiple hypotheses packet decoding performance is achieved while mitigating multiple hypotheses receiver complexity. A reference number is utilized to perform hypotheses. The reference number is independent of a start of packet. A sequence of reference numbers can be utilized, which may not necessarily be sequential numbers. The reference numbers are pre-defined.

43 Claims, 19 Drawing Sheets

| Pkt# | 1 | 1 | 1 | 2 | 2 | 3 | 3 | 3 | 3 | 4 | 4 | 4 | 4 | 5 | 5 | 5 | 6 | 6 |
|---|---|---|---|---|---|---|---|---|---|---|---|---|---|---|---|---|---|---|
| Tx# | 1 | 2 | 3 | 1 | 2 | 1 | 2 | 3 | 4 | 1 | 2 | 3 | 4 | 1 | 2 | 3 | 1 | 2 |
|  | 1 | 2 | 3 | 1 | 2 | 1 | 2 | 3 | 4 | 1 | 2 | 3 | 4 | 1 | 2 | 3 | 1 | 2 |

Hypo #1: 1 2 3 4 5
Hypo #2: 1 2 3 4
Hypo #3: 1 2 3

FIG. 8

| Pkt# | 1 | 1 | 2 | 2 | 3 | 3 | 3 | 4 | 4 | 4 | 4 | 5 | 5 | 5 | 6 | 6 |
|---|---|---|---|---|---|---|---|---|---|---|---|---|---|---|---|---|
| Tx# | 1 | 2 | 3 | 4 | 5 | 6 | 1 | 2 | 3 | 4 | 5 | 6 | 1 | 2 | 3 | 4 | 5 |

(Note: row 1008 indicates the Tx sequence)

FIG. 10

PACKET-ASYNCHRONOUS HYBRID-ARQ

CROSS-REFERENCE

This application claims the benefit of U.S. Provisional Application Ser. No. 60/896,035, filed Mar. 21, 2007, entitled "METHOD AND APPARATUS FOR PACKET-ASYNCHRONOUS HYBRID-ARQ," and assigned to the assignee hereof and the entirety of which is incorporated herein by reference.

BACKGROUND

I. Field

The following description relates generally to communication systems and more particularly to a low receiver complexity approach for reliable packet decoding when Hybrid ARQ (H-ARQ) protocol is employed with persistent assignment and an optional erasure sequence transmission.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long-Term Evolution (LTE) systems, orthogonal frequency division multiple access (OFDMA) systems, as well as others.

Typically, most communication systems ensure reliable exchange of data by employing an error control method such as a Hybrid ARQ (H-ARQ) protocol. H-ARQ protocols are commonly employed along with persistent assignment and optional erasure sequence transmission over small bandwidth channels with low throughput traffic such as VOIP (Voice over Internet Protocol) networks. H-ARQ techniques increase complexity of the system but can provide significant improvement in capacity. With Hybrid ARQ, a packet is sent using multiple transmissions. The packet transmission could be terminated early if the receiver can decode the packet prior to receiving the entire transmission. However, in order for early termination, the receiver (or recipient) must provide some acknowledgement that the data was received.

In order to make the communication between systems more efficient, a concept of persistent assignments is used. Persistent assignments are useful in a scheduled data transmission system in cases where many users are competing for limited assignment message resources. A persistent assignment occurs when a resource (e.g., a channel) that is assigned to a particular user (e.g., user device) continues to be available to that user after transmission of a data packet is completed. Thus, a new assignment message is not necessary to enable a user to continue transmission between the two systems.

The above can be achieved by optionally transmitting a low power sequence, such as an erasure sequence, when data is not being transmitted over the channel. The erasure sequence aids in notifying a receiver that a transmitter is likely to transmit another data packet over the channel. In this manner, the receiver does not end the communication process or assume that a link has failed. Thus, the transmitter can continue to communicate with the receiver and transmit the next data packet after the erasure sequence.

Typically, in advanced high-speed data communication systems employing H-ARQ protocol with persistent assignment, the optional erasure sequence is sent as a keep-alive indication when there is temporarily no data to transmit. The erasure sequence, however, is sent at a small fraction of the normal transmit power level since the erasure sequence only contains a single information bit, and as a result may suffer unreliable detection at the receiver, especially if the assignment has small bandwidth. This can cause problems at the receiver because failure to recognize the start of packet (SOP) prevents the packet from being correctly decoded, implying reduced throughput and increased latency jitter or data loss depending on whether the application enables upper layer re-transmission.

Conventional systems employ various methods in an attempt to solve the above mentioned problem. One attempted solution is to directly improve erasure detection reliability by increasing transmission power. However, increased transmission power can lead to an increased level of interference. Another attempted solution is to improve SOP determination reliability, despite unreliable erasure detection, by attempting multiple SOP hypotheses at the cost of receiver complexity. Another attempted solution method includes avoiding erasure detection altogether by sending filler data from upper layer at the cost of transmitter complexity for cross-layer coordination, increased level of interference, and can shorten battery life. The approaches presented by conventional systems in an attempt to solve the reliability issue of packet decoding increase resource consumption and overall complexity of the system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with a low receiver complexity approach for reliable packet decoding when Hybrid ARQ (H-ARQ) protocol is employed with persistent assignment and optional erasure sequence transmission, especially over small bandwidth allocation. The disclosed aspects can achieve multiple hypotheses packet decoding performance while mitigating multiple hypotheses receiver complexity.

An aspect relates to a method for transmitting a data packet employing a Hybrid-ARQ protocol over a network. The method includes encoding a data packet and assigning a reference number to the encoded data packet. The encoded data packet is modulated and transmitted over the network after modulation.

Another aspect relates to a wireless communications apparatus that includes a processor and a memory. The memory retains instructions related to encoding a data packet, assigning a reference number to the encoded data packet independent of a start of packet, modulating the encoded data packet, and communicating the encoded data packet over the air after modulation. The processor is coupled to the memory and is configured to execute the instructions retained in the memory.

Yet another aspect relates to a wireless communications apparatus that employs a Hybrid-ARQ protocol. The wireless communications apparatus includes a means for encoding a data packet and a means for choosing a reference number for the encoded data packet. Also included in the apparatus is a means for modulating the encoded data packet and a means for sending the encoded data packet over a network after modulation.

Still another aspect relates to a machine-readable medium having stored thereon machine-executable instructions for encoding a data packet. The instructions are also for assigning a reference number to the encoded data packet, modulating the encoded data packet, and transmitting the encoded data packet over the network after modulation.

In a wireless communications system another aspect relates to an apparatus that includes a processor. The processor can be configured to retain instructions related to encoding a data packet and assign a reference number to the encoded data packet. Further, the processor can be configured to modulate the encoded data packet and communicate the encoded data packet over the air after modulation.

In accordance with a related aspect is a method for receiving a data packet employing a Hybrid-ARQ protocol over a network. The method includes receiving an encoded data packet transmitted over a network. The encoded data packet includes a reference number. The method further includes demodulating the encoded data packet, performing hypothesis based upon the reference number, and decoding the encoded data packet.

Another aspect relates to a wireless communications apparatus that includes a memory and a processor. The memory can retain instructions related to receiving an encoded data packet transmitted over a network, the encoded data packet includes a reference number, demodulating the encoded data packet, performing hypothesis based upon the reference number and decoding the encoded data packet. The processor is coupled to the memory and can be configured to execute the instructions retained in the memory.

Yet another aspect relates to a wireless communications apparatus that employs a Hybrid-ARQ protocol. The wireless communications apparatus includes a means for receiving an encoded data packet transmitted over a network, the encoded data packet includes a reference number. Further, the wireless communications apparatus includes a means for demodulating the encoded data packet, a means for performing hypothesis based upon the reference number, and a means for decoding the encoded data packet.

Still another aspect relates to a machine-readable medium having stored thereon machine-executable instructions for receiving an encoded data packet transmitted over a network, the encoded data packet includes a reference number and demodulating the encoded data packet. Further, the instructions are for performing hypothesis based upon the reference number and decoding the encoded data packet.

In a wireless communications system another aspect relates to an apparatus that includes a processor configured to receive an encoded data packet transmitted over a network, the encoded data packet includes a reference number and demodulate the encoded data packet. Further, the processor is configured to perform hypothesis based upon the reference number and decoding the encoded data packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

FIG. 8 illustrates a conventional multiple SOP hypotheses receiver operation of an example similar to that of the above figure for SOP-synchronous H-ARQ transmission.

FIG. 10 illustrates a multiple SOP hypotheses receiver operation.

DETAILED DESCRIPTION

Figure 1:
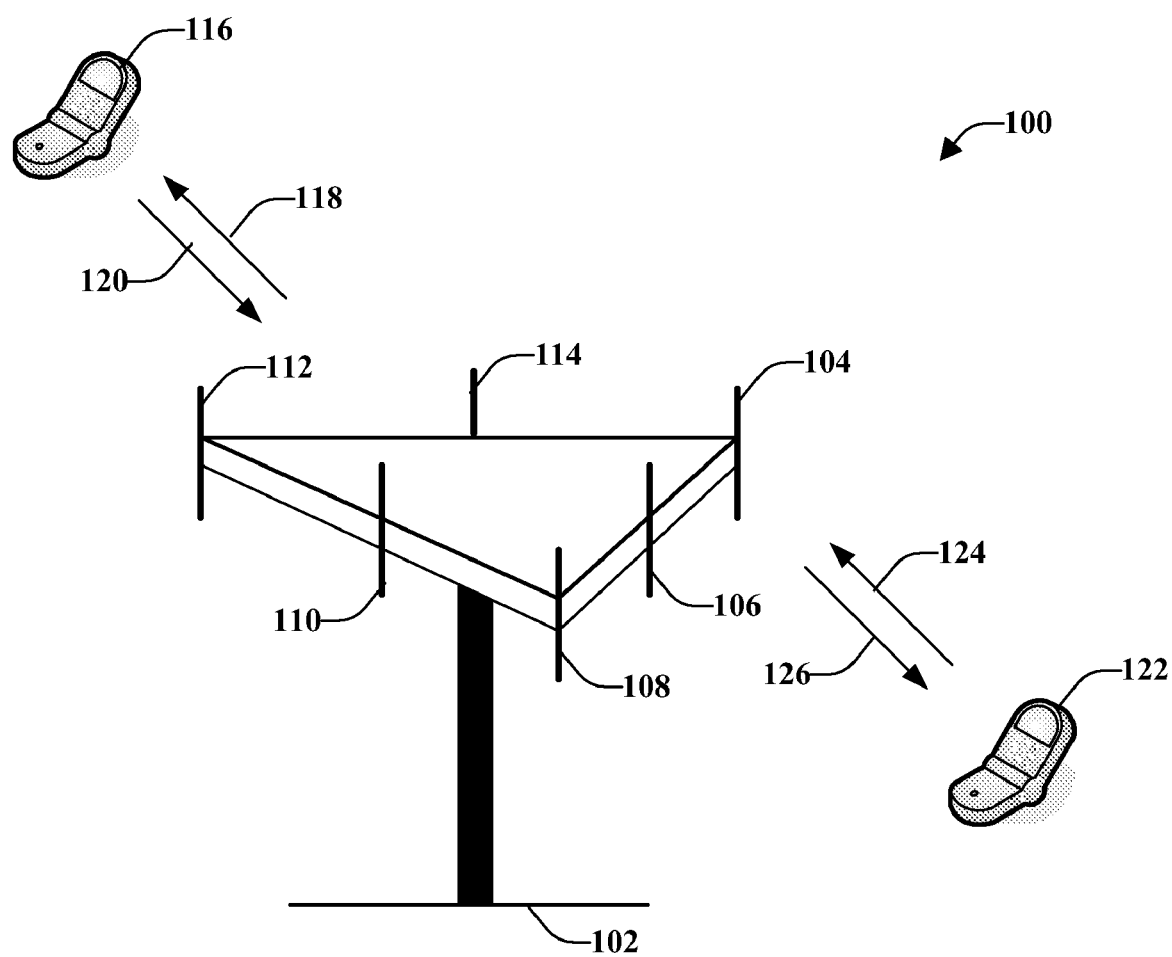
FIG. 1 illustrates a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a multiple access wireless communication system 100 according to one or more aspects is illustrated. A wireless communication system 100 can include one or more base stations in contact with one or more user devices. Each base station provides coverage for a plurality of sectors. A three-sector base station 102 includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over reverse link 120 and receive information from mobile device 116 over forward link 118. Forward link (or downlink) refers to the communication link from the base stations to mobile devices, and the reverse link (or uplink) refers to the communication link from mobile devices to the base stations. Mobile device 122 is in communication with antennas 104 and 106, where antennas 104 and 106 transmit information to mobile device 122 over forward link 126 and receive information from mobile device 122 over reverse link 124. In a FDD system, communication links 118, 120, 124, and 126 may use different frequencies for communication. For example, reverse link 120 may use a different frequency than that used by forward link 118.

Each group of antennas and/or the area in which they are designated to communicate may be referred to as a sector of base station 102. In one or more aspects, antenna groups each are designed to communicate to mobile devices in a sector or the areas covered by base station 102. A base station may be a fixed station used for communicating with the terminals.

In communication over forward links 118 and 126, the transmitting antennas of base station 102 can utilize beamforming in order to improve the signal-to-noise ratio of forward links for the different mobile devices 116 and 122. Also, a base station utilizing beamforming to transmit to mobile devices scattered randomly through its coverage area can cause less interference to mobile devices in neighboring cells than a base station transmitting though a single antenna to all its mobile devices.

Multiple access wireless communication system 100 can employ a Hybrid-ARQ protocol in accordance with the disclosed aspects. The SOP asynchronous Hybrid-ARQ protocol can increase packet decoding reliability without increased erasure transmission power, filler data, and/or multiple SOP hypotheses testing complexity.

Figure 2:
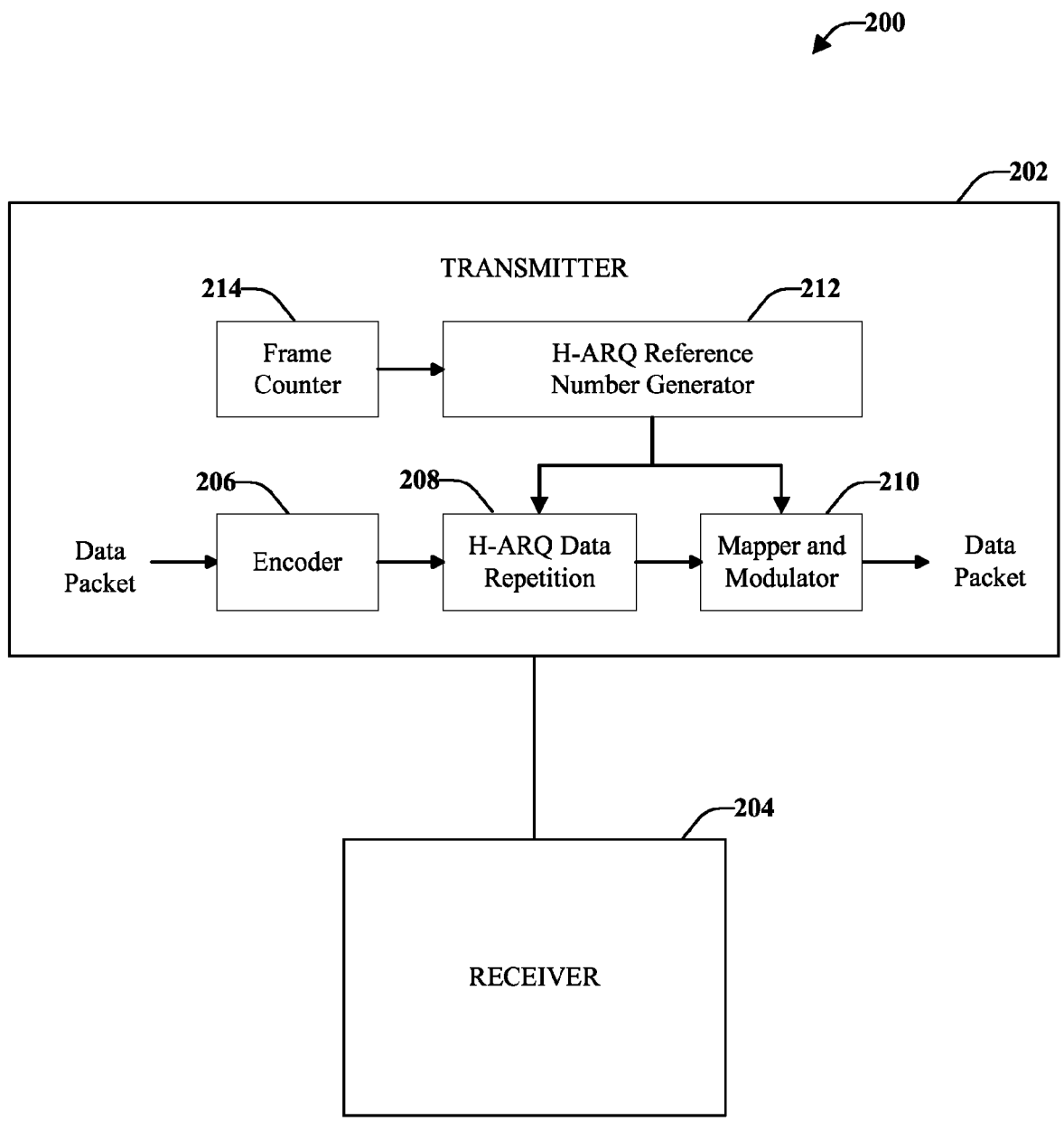
FIG. 2 illustrates a system for Start of Packet (SOP) asynchronous H-ARQ in accordance with the disclosed aspects.

FIG. 2 illustrates a system 200 for Start of Packet (SOP) asynchronous H-ARQ in accordance with the disclosed aspects. SOP asynchronous H-ARQ can be applied to any data communication that employs H-ARQ protocol. System 200 mitigates unreliable SOP determination due to unreliable detection of erasure sequence transmission. Further, system 200 can increase reliability of SOP determination and packet decoding for assignment with small bandwidth without resorting to multiple hypotheses testing.

System 200 includes a transmitter 202 and a receiver 204. Although a number of transmitter(s) 202 and receiver(s) 204 can be included in system 200, as will be appreciated, a single transmitter 202 that transmits communication with a single receiver 204 is illustrated for purposes of simplicity. Transmitter 202 and receiver 204 can communicate such that a H-ARQ transmission alignment is decoupled from SOP in order to mitigate the need for multiple hypothesis testing. It should be noted that multiple hypotheses are for detection of unknown H-ARQ alignment, which does not have to be associated with SOP. Further packet decoding only needs to know the H-ARQ alignment, which can be predetermined.

During SOP-asynchronous H-ARQ the transmitter 202 should be able to start from any reference number, not just a single reference number, such as transmission #1. The transmitter 202 should also be able to continue with non-sequential transmission numbers. This can be performed if the transmitter 202 has the entire encoded packet ready for mapping and modulation to start anywhere based on a given reference number, not based on SOP. It should be noted that the reference number can be any number or indicator, provided both transmitter 202 and receiver 204 are aware of the number. Throughout this detailed description this reference number may be referred to as a transmission number, however, the various aspects are not limited to a transmission number and any reference can be utilized with the disclosed aspects.

Transmitter 202 can include an encoder 206 that can encode a data packet by employing data encoding technique, such as convolution coding or Turbo coding, for example. Also included is a H-ARQ data repeater 208 that employs the encoded data packet for retransmissions. The encoded data packet can be further mapped and modulated before transmission by a Mapper and Modulator 210. Once mapped and modulated, the encoded data packet can be sent to receiver 204 over any network, such as a wireless network.

The transmission of the encoded packet ready for mapping and modulation can start anywhere based on a reference number obtained from an H-ARQ reference number generator 212 that can utilize a frame counter 214 to generate reference numbers for the encoded data packet. Thus, transmitter can transmit data symbols over a network, not necessarily starting from a single reference number, such as transmission number 1, but from any reference number, and can continue transmitting in a non sequential manner. The reference number is not necessarily sequential as long as system 200 is not SOP synchronous.

Figure 3:
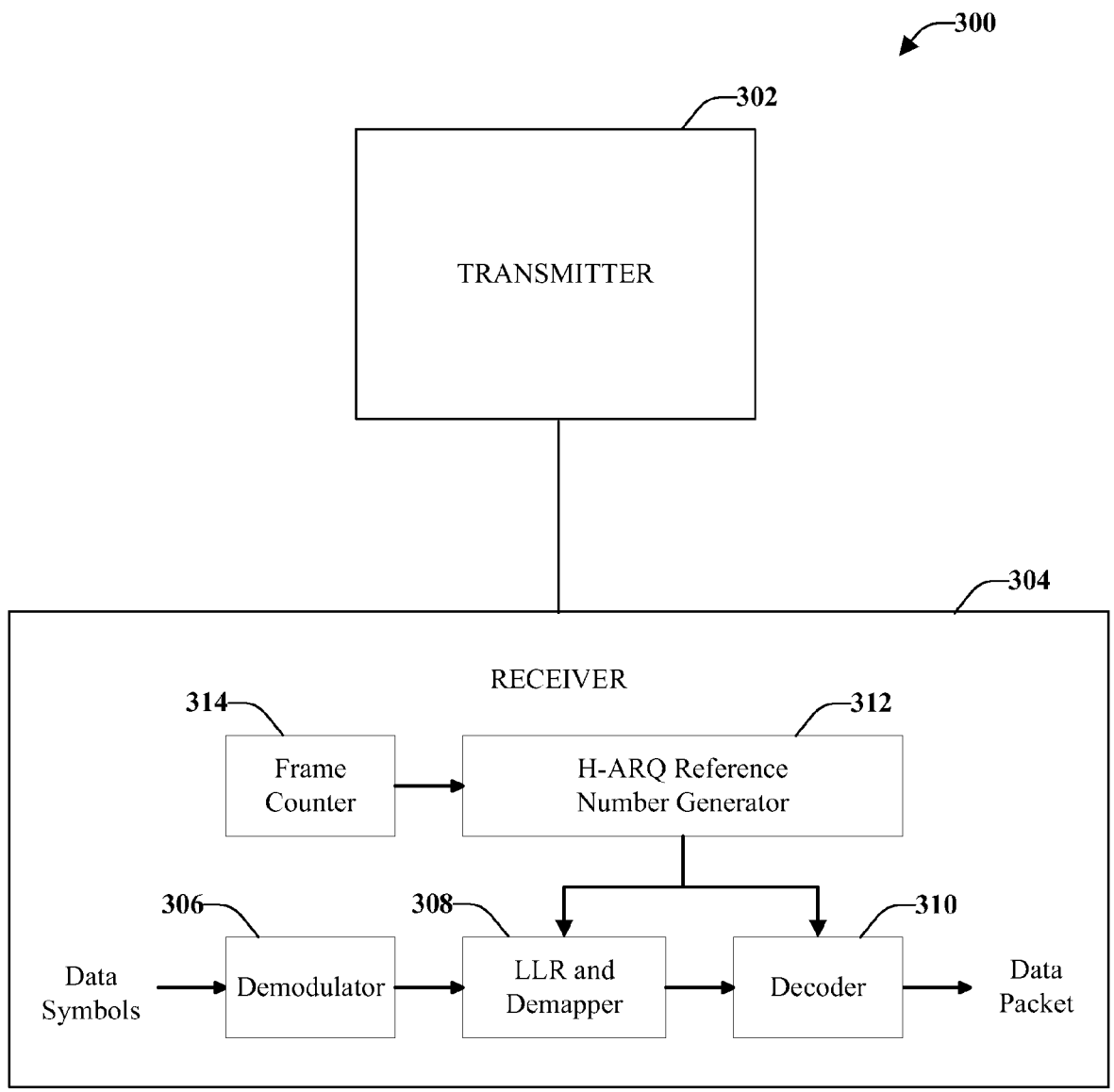
FIG. 3 illustrates another system for Start of Packet (SOP) asynchronous H-ARQ in accordance with the disclosed aspects.

FIG. 3 illustrates another system for Start of Packet (SOP) asynchronous H-ARQ in accordance with the disclosed aspects. Similar to the above figure, system 300 includes one or more transmitters 302 in communication with one or more receivers 304.

Receiver 304 can employ SOP-asynchronous H-ARQ protocol for reception and decoding of encoded data packets. Receiver 304 can receive data symbols transmitted by transmitter 302 over a network. Included in receiver 304 can be a demodulator 306 that demodulates the incoming data symbols as per the modulation technique employed. A LLR and demapper 308 can be configured to improve error rate performance by combining retransmission bits based on Log Likelihood Ratio (LLR) of each bit of the demodulated data symbols in receiver 304. A decoder 310 can be configured to decode the received signal and obtain the data packet. The decoder 310 and LLR and demapper 308 can employ a H-ARQ reference number generator 312 that can utilize a frame counter 314 to generate references numbers for the encoded data packet on the receiver side.

Figure 4:
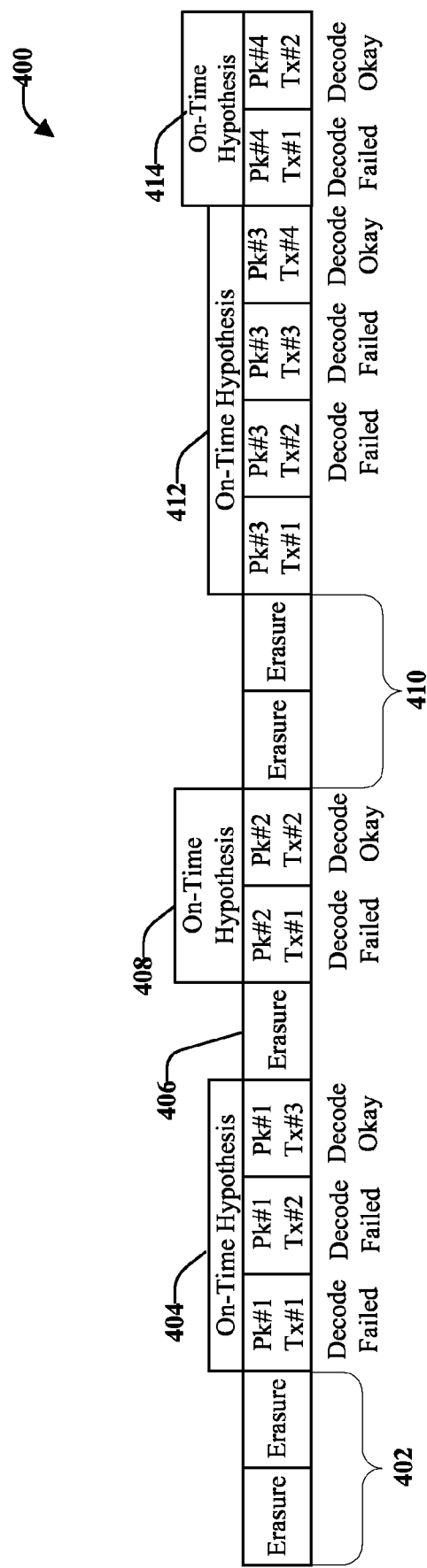
FIG. 4 illustrates H-ARQ decoding when all start of packets (SOPs) are known.

In order to fully appreciate the disclosed aspects, H-ARQ packet decoding will be discussed in further detail. FIG. 4 illustrates H-ARQ decoding 400 when all start of packets (SOPs) are known. The illustrated H-ARQ decoding 400 represents a conventional SOP-synchronized H-ARQ transmission wherein a H-ARQ packet is decoded for persistent assignment.

H-ARQ protocol can be utilized in advanced high speed data transmission system design in order to exploit channel capacity bound. However, such use can be demanding on receiver complexity. A challenge with persistent assignment includes determining where the SOPs are for correct decoding of data packets because packets might not be transmitted back-to-back (e.g., there can be a silence or quiet period between packets) and SOP of each data packet will not be indicated by a new assignment. The illustrated ideal H-ARQ packet decoding 400 assumes that the SOP is known for each packet transmitted. If all the SOPs are known, then an "ideal" H-ARQ packet decoding for persistent assignment can be achieved.

A receiver (such as receiver 204 and 304) demodulates and properly combines successive transmissions for decoding frame-by-frame until successful or until a maximum number of transmissions has been reached. Upon successful decoding, the receiver sends a positive acknowledgement (ACK) to the transmitter (such as transmitter 202 and 304) for termination of the current packet. The transmitter can either send the next data packet if available, or optionally send an erasure sequence to indicate the desire for keeping the assignment active while waiting for more data to become available.

As illustrated, an erasure sequence 402 can be followed by a start of a first packet (Pkt #1) 404 that includes three transmissions (Tx #1, Tx #2, and Tx #3). As illustrated, the transmission of each data packets always starts with H-ARQ transmission #1, followed by #2, #3, and so forth. This is referred to as SOP-synchronized H-ARQ transmission. If there is on-time hypothesis (e.g., the decoding attempt is not early nor late), then the decoding fails for the first two transmissions (Tx #1 and Tx #2) but is successful on the third transmission (Tx #3). Then, in this example, there is another erasure sequence 406, after which a second packet (Pkt #2) 408 having two transmissions (Tx #1 and Tx #2) arrives. Employing an on-time hypothesis results in a successful decoding attempt (Decode Okay). After another erasure sequence 410, a third packet (Pkt #3) that includes four transmissions (Tx #1, Tx #2, Tx #3, and Tx #4) are decoded successfully. A fourth packet (Pkt #4) 414 is sent, without an erasure sequence between Pkt #3 412 and Pkt #4 414 (e.g., transmitted back-to-back). However, since the SOP is known for the "ideal" H-ARQ decoding illustrated, Pkt #4 414 is successfully decoded. It should be understood that any number of transmissions, packets, and/or erasure sequences can be sent for each packet and the number of transmissions, packets, and erasure sequences illustrated are for example purposes only.

Figure 5:
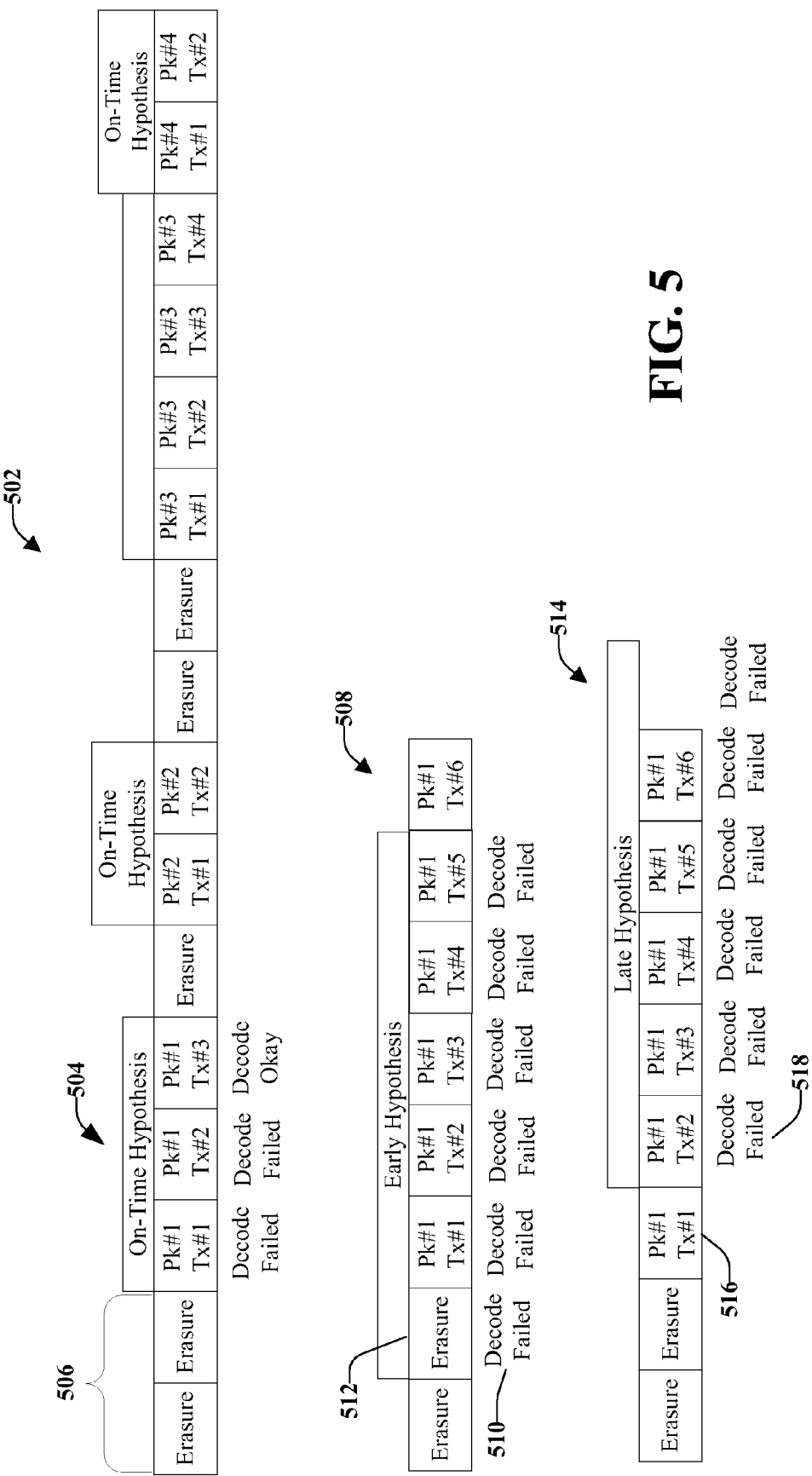
FIG. 5 illustrates examples of H-ARQ decoding when SOPs are unknown.

Positions of SOP is not available at the receiver but can be determined by attempting to detect erasure sequence if an erasure sequence was transmitted. When such detection is incorrect, packet decoding will fail due to incorrect data alignment and combining over successive transmissions. FIG. 5 illustrates examples of H-ARQ decoding when SOPs are unknown. If the SOPs are not known, it can result in early or late SOP hypotheses. Packet decoding attempts will fail for both early hypotheses and late hypotheses. For reference, illustrated at 502 is H-ARQ decoding when SOPs are known (e.g., ideal H-ARQ packet decoding), which was described with reference to the above figure. If on-time hypothesis is employed, the packet is successfully decoded (Decode Okay). In this example, the first packet (Pk #1) is successfully decoded after an erasure sequence 506 since the SOP was known.

Early hypothesis is illustrated at 508. During early hypothesis, decoding is attempted some time before the first packet (Pk #1) arrives. In this example, the first decoding attempt 510 occurred during an erasure sequence 512. Since the decoding attempt occurred earlier than the SOP, the entire packet decoding attempt fails (Decode Failed).

The situation that occurs for late hypothesis is illustrated at 514. For late hypothesis, the decoding attempt occurs some time after the SOP. As illustrated, at least a portion of the packet, here the first transmission of the first packet (Pk #1, Tx #1) 516, arrives before decoding 518 is attempted. In the case of late hypothesis, the packet decoding attempt fails (Decode Failed).

Figure 6:
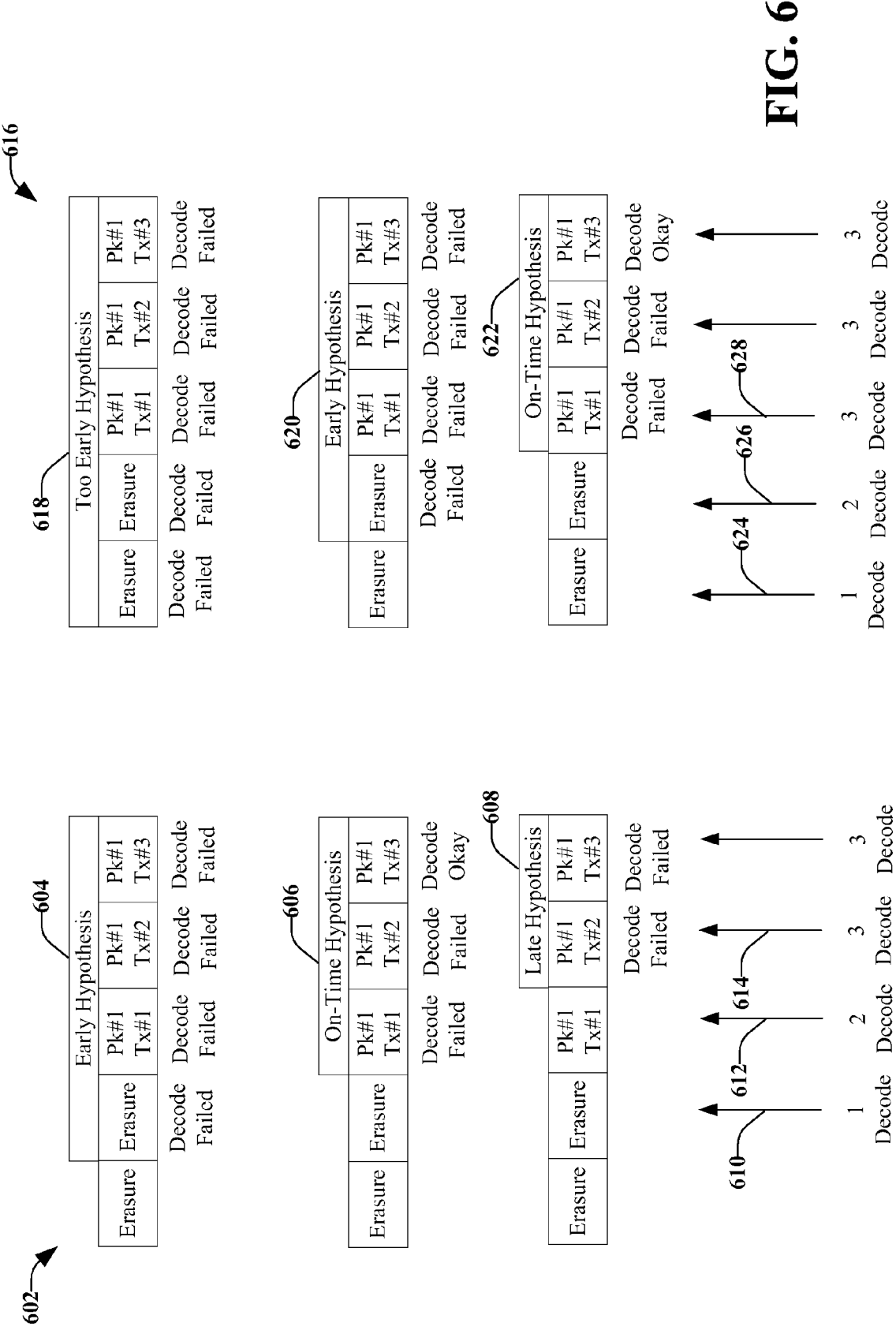
FIG. 6 illustrates examples of three SOP hypotheses, decoding all transmissions.

As long as the detected SOP has a reasonable distribution around the true SOP, the reliability can be improved with multiple decode attempts around the likely hypothesis. However, multiple decode attempts can be costly in terms of receiver complexity. FIG. 6 illustrates examples of three SOP hypotheses, decoding all transmissions.

The first example 602, on the left-hand side of the figure, includes an early hypothesis 604, an on-time hypothesis 606, and a late hypothesis 608. The first decode attempt 610 corresponds with the early hypothesis 604. The second decode 612 attempt corresponds with the on-time hypothesis 606. A third decode attempt 614 corresponds with the late hypothesis 608. The correct hypothesis is the second hypothesis (e.g., the on-time hypothesis 606). Thus, the second decode attempt 612 was correct. The cost of this correct hypothesis is the sum of the number of decoding attempts (1, 2, 3, 3) resulting in a total of nine attempts (1+2+3+3) over four transmissions.

The second example, on the right-hand side 616 of the figure, has a too early hypothesis 618, an early hypothesis 620 and an on-time hypothesis 622. The first decoding attempt 624 corresponds with the too early hypothesis 616. The second decoding attempt 626 corresponds with the early hypothesis 618 and the third decoding attempt 628 corresponds with the on-time hypothesis 622. In this example, the third hypothesis (e.g., on-time hypothesis 622) is correct. The cost of this correct hypothesis is the sum of the number of decoding attempts (1, 2, 3, 3, 3) resulting in a total of twelve attempts (1+2+3+3+3) over five transmissions.

An extreme case, which is not illustrated, is that none of the three hypotheses is correct. If none of the three hypotheses are correct, the cost of the decoding failure is the sum of the number of decoding attempts (1, 2, 3, 3, 3, 3, 2, 1) resulting in a total of eighteen attempts (1+2+3+3+3+3+2+1) over eight transmissions with no success.

Principles of SOP-asynchronous H-ARQ transmission include (1) multiple hypotheses are mainly for detection of unknown H-ARQ alignment, (2) which does not have to tie with SOP, (3) packet decoding really only needs to know H-ARQ alignment, and (4) having H-ARQ alignment predetermined and known to the receivers mitigates the need for multiple hypotheses.

Figure 7:
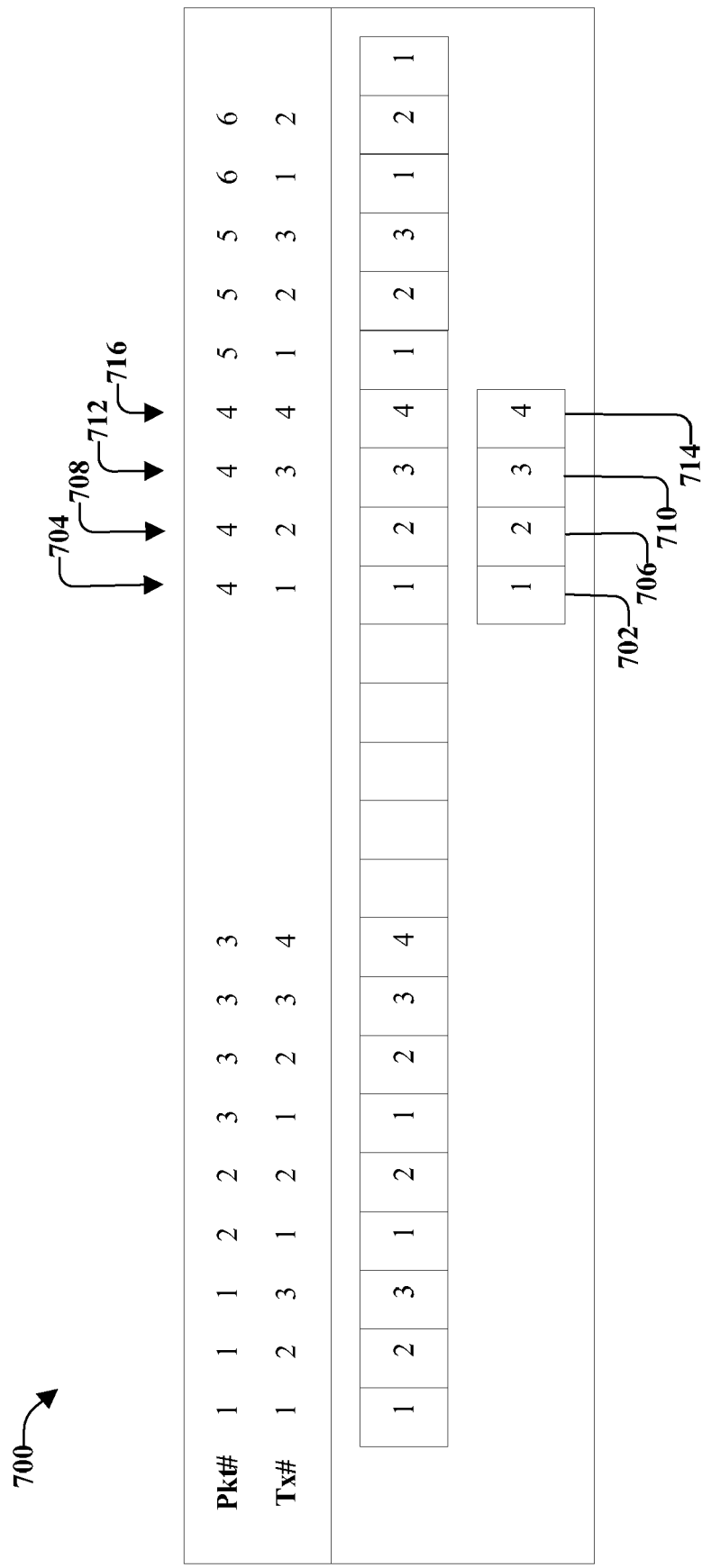
FIG. 7 illustrates a conventional single SOP hypothesis receiver operation for SOP-synchronous H-ARQ transmission.

FIG. 7 illustrates a conventional single SOP hypothesis receiver operation 700 for SOP-synchronous H-ARQ transmission. The illustrated operation 700 always starts from transmission #1 at each SOP. In the example, the receiver attempts decoding of (#1) 702 after packet #4 transmission #1 (704) but failed. The receiver then attempts decoding of (#1, #2) 706 after of packet #4 transmission #2 (708) but failed again. Next an attempt is made to decode (#1, #2, #3) 710 after packet #4 transmission #3 (712) but failed once again. Another attempt is made to decode (#1, #2, #3, #4) 714 after packet #4 transmission #4 (716), which is successful.

FIG. 8 illustrates a conventional multiple SOP hypotheses receiver operation 800 of an example similar to that of the above figure for SOP-synchronous H-ARQ transmission. This example assumes a window of three-hypotheses (labeled Hypo #1 (802), Hypo #2 (804), and Hypo #2 (806)) centered on the correct SOP 808, which is the first transmission of the fourth packet. The receiver can attempt between nine and eleven decoding attempts, instead of four as in the case of single SOP hypothesis, for packet #4, as discussed with reference to the above figure. The receiver complexity scales up about three times going from single hypothesis to three hypotheses.

The disclosed aspects assist to provide that decoding does not have to always start from transmission #1 at each SOP, and might not have to use transmission numbers sequentially. It should be noted that in accordance with the disclosed aspects, the transmission number can be any reference that is known, such as a generic reference number.

Figure 9:
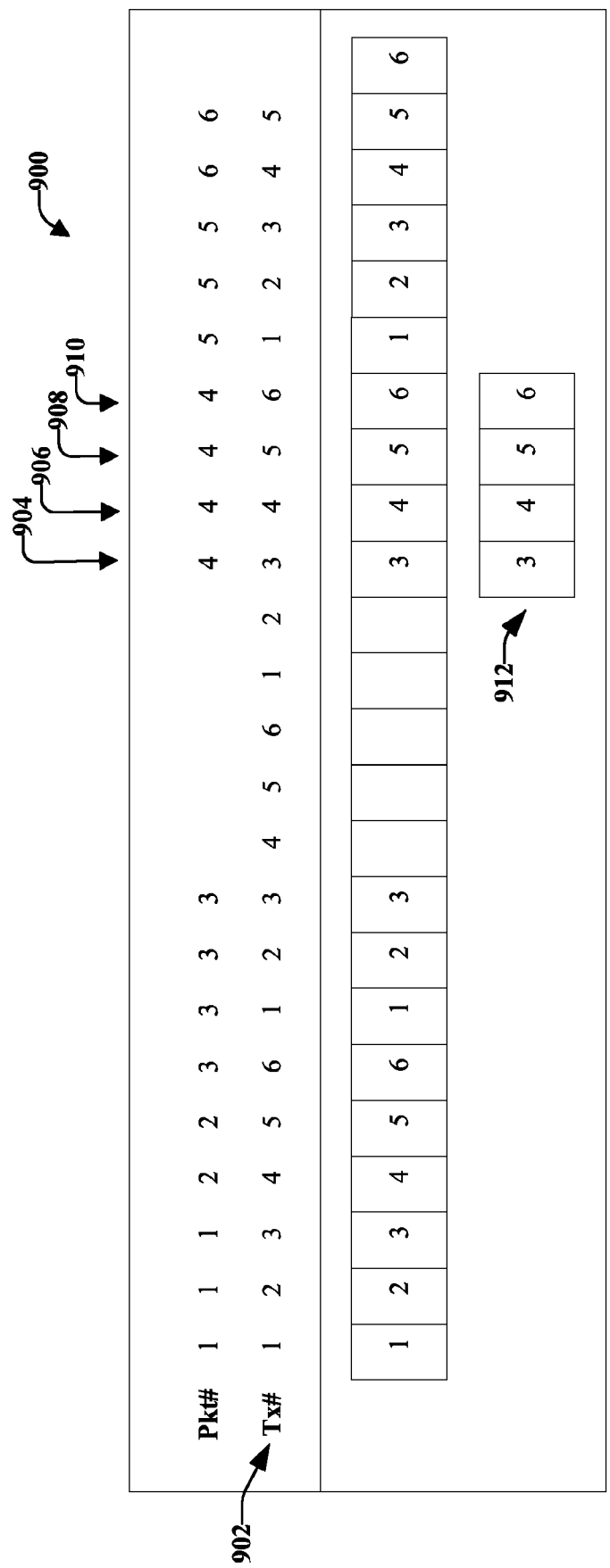
FIG. 9 illustrates a single hypothesis of SOP-asynchronous H-ARQ in accordance with the disclosed aspects.

FIG. 9 illustrates a single hypothesis 900 of SOP-asynchronous H-ARQ in accordance with the disclosed aspects. According to an aspect, the communication systems may not always start from transmission #1 (or other reference #1) and may not even use transmission numbers sequentially. In this example, the reference number (illustrated as transmission number) cycles through the numerals 1 through 6 (1, 2, 3, 4, 5, 6). The transmission number of other reference does not reset at SOPs. This is illustrated at 902, wherein the transmission numbers repeat continuously through the range of selected numbers or other references. As a result, the transmission numbers and the SOPs are completely independent as shown at the start of packet number 2 (904) wherein the transmission number (or other reference) is 4, not 1 as in the previous examples.

The receiver operation in accordance with this aspect is similar to the operation discussed with reference to FIG. 7. However, in accordance with this aspect, instead of the transmission numbers for packet 4 being (#1, #2, #3, #4), where are elements 704, 708, 712, and 716 in FIG. 7, here the transmission numbers are now (#3, #4, #5, #6), illustrated at 904, 906, 908, and 910, respectively. Thus, since the transmission numbers repeat, the decoding attempt is successful, as indicate by the hypothesis 912.

It should be noted that the actual number of transmissions required to decode packet #4 may be different between SOP-synchronous and SOP-asynchronous methods due to underlined encoding and spectral efficiency specification for a given system. For the discussion of the disclosed aspects, it is assumed that each system will be properly designed depending on the method chosen and the difference should be small.

Figure 10:
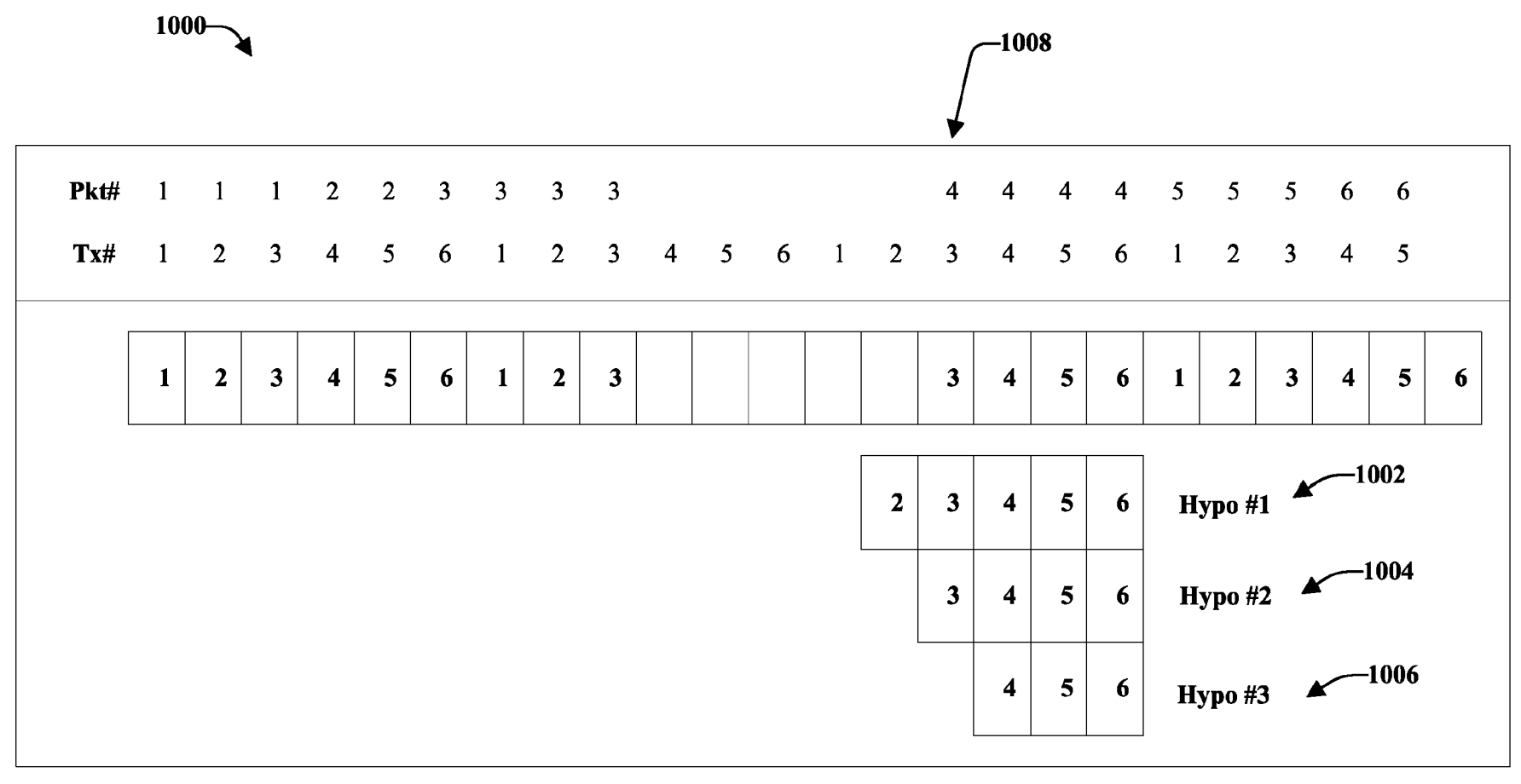

Multiple SOP hypotheses receiver operation 1000 for SOP-asynchronous H-ARQ is illustrated in FIG. 10. The illustrated figure assumes a window of three-hypotheses (labeled Hypo #1 (1002), Hypo #2 (1004), and Hypo #3 (1006)) centered on the correct SOP (1008). This operation is similar to the operation of FIG. 8, with the difference that the transmission numbers for all three hypotheses are now aligned, instead of staggered as in FIG. 8. For example, transmission numbers 4, 5, and 6 are aligned in Hypo #1 (1002), Hypo #2 (1004) and Hypo #3 (1006). Having the three hypotheses aligned mitigates the need for multiple hypotheses testing.

Figure 11:
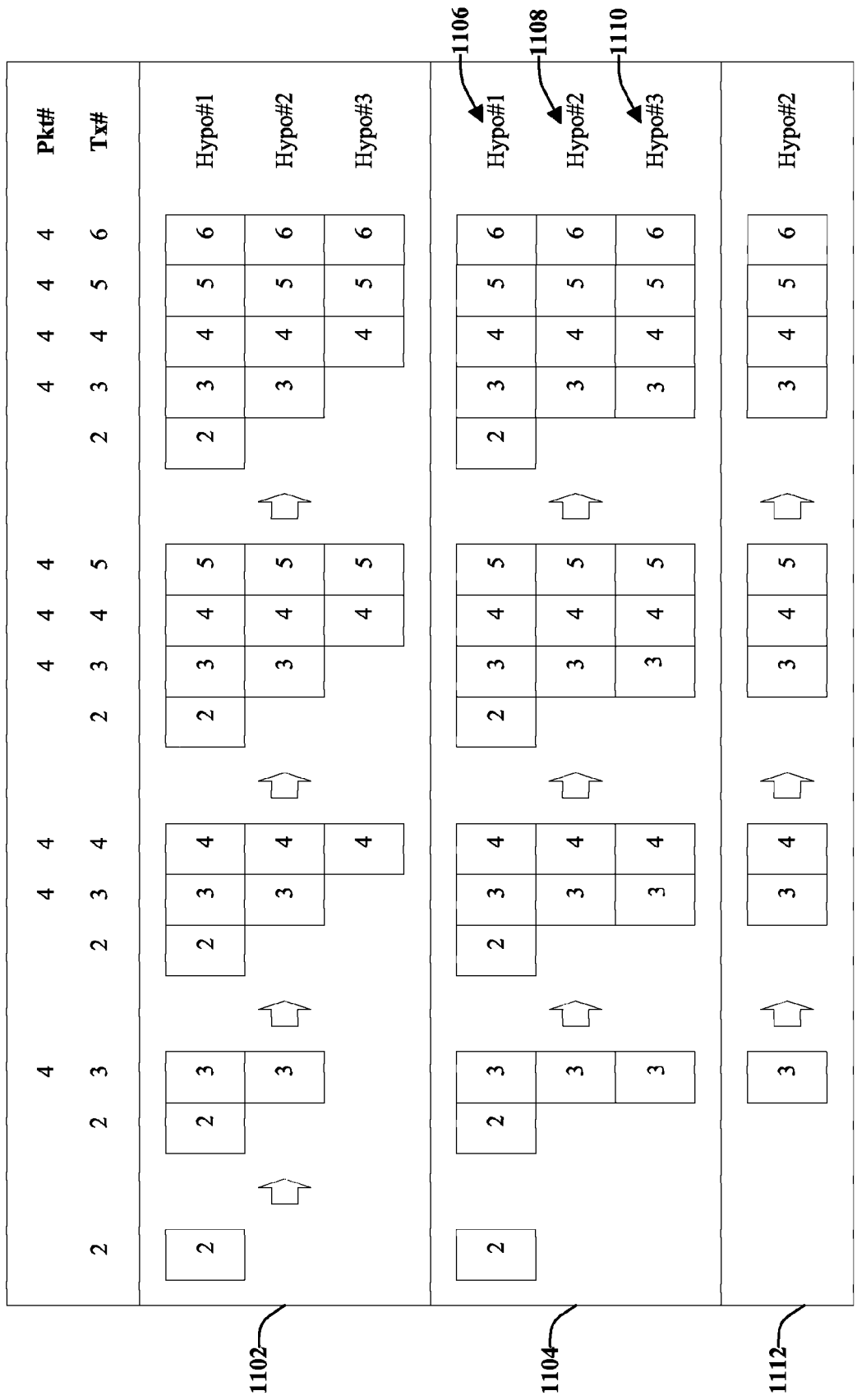
FIG. 11 illustrates hypothesis degeneration with SOP-asynchronous H-ARQ.

The reason multiple hypotheses is not needed for SOP-asynchronous H-ARQ in accordance with the disclosed aspects is illustrated in FIG. 11. This figure is divided into three parts. The top portion 1102 illustrates how the three hypotheses accumulate over successive transmissions. The middle portion 1104 illustrates how the three hypotheses (Hypo #1 (1106), Hypo #2 (1108), and Hypo #3 (1110)), are similar since that there is in effect only one hypothesis.

Hypothesis #1 (1106) includes potential transmission #2 which is an erasure causing the signal-to-noise ratio to be slightly below that of hypothesis #2 (1108). Other than transmission #2, hypotheses #1 (1106) and hypotheses #2 (1108) are really the same hypotheses. Hypothesis #3 (1110), on the other hand, incorporates one less transmission than hypotheses #2 (1108) with no or very little chance of decoding as well as hypothesis #2 (1108). For SOP-asynchronous H-ARQ, multiple hypotheses degenerate into single hypothesis as shown at the bottom 1112 of FIG. 11.

Figure 12:
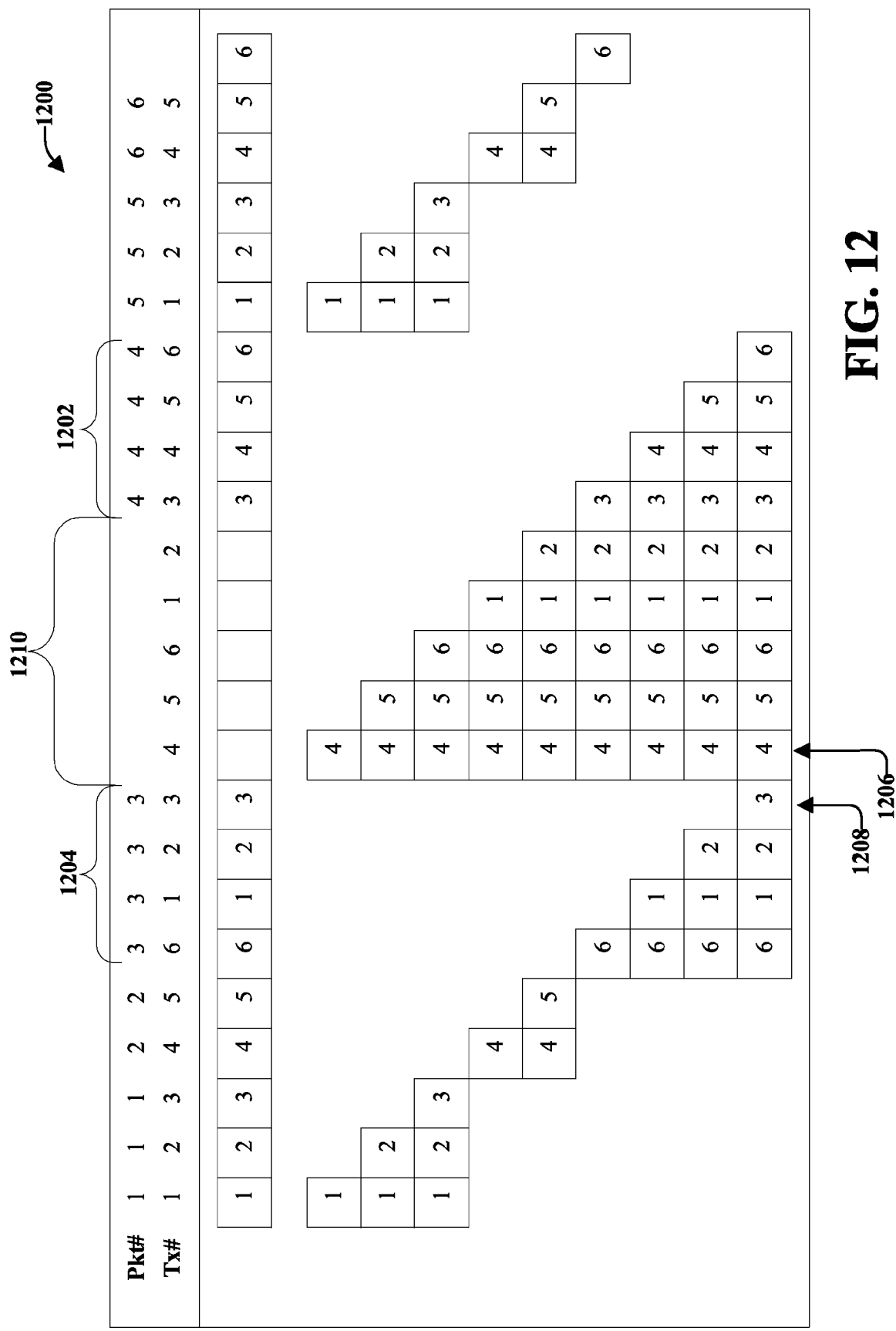
FIG. 12 illustrates hypothesis testing of SOP-asynchronous H-ARQ.

There are a number of manners of decoupling H-ARQ alignment and SOPs. FIG. 12 illustrates hypothesis testing 1200 of SOP-asynchronous H-ARQ. For this example, the packet decoding operation of SOP-asynchronous H-ARQ transmission, regardless of assignment bandwidth allocation and hence erasure detection reliability, is illustrated.

As illustrated, decoding of packet #4 (1202) is the worst case in which erasure detection fails all the time. As a result, the single hypothesis testing for packet #4 (1202) starts immediately (at 1206) after successful decoding (at 1208) of packet #3 (1204) until four actual transmissions for packet #4 (1202). It is possible to cost one more transmission for packet #4 (1202) to decode successfully because of signal-to-noise degradation from the five erasure transmissions (1210) included in this worst-case example. Actual performance should be better if some of the erasure detections can be successful so that the hypothesis accumulation can be restarted to include less erasure frames.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 13:
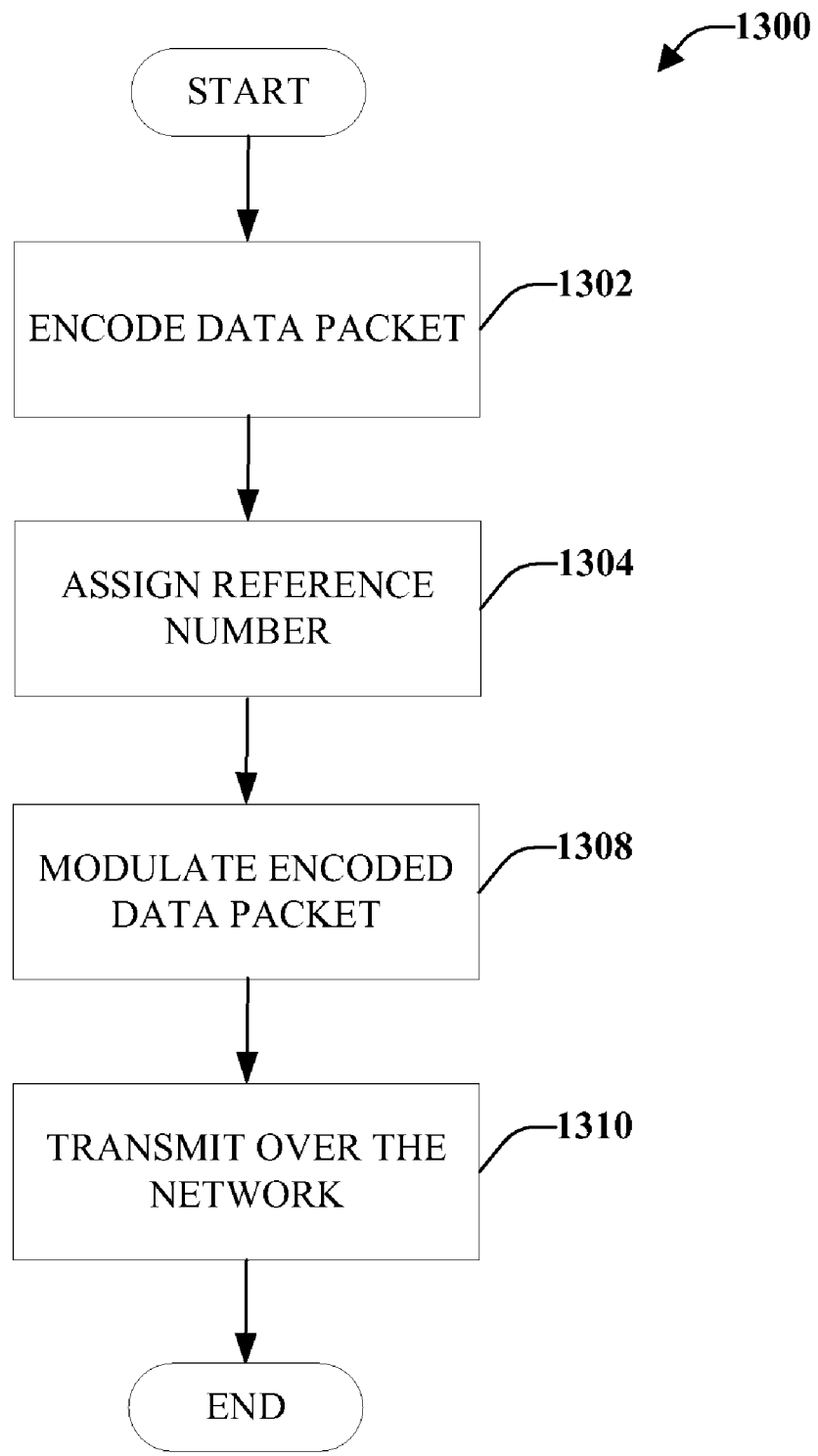
FIG. 13 illustrates a method for transmitting a data packet employing a Hybrid-ARQ protocol over a network.

FIG. 13 illustrates a method 1300 for transmitting a data packet employing a Hybrid-ARQ protocol over a network. Method 1300 can help solve problems related to reliably issues of packet decoding without requiring increased erasure transmission power, filler data, or multiple SOP hypotheses testing complexity.

Method 1300 starts, at 1302, when a data packet is encoded. The data packet can be encoded utilizing various encoding techniques, such as turbo codes or convolution codes, for example. At 1304, a reference number is assigned to the encoded data packet. The reference number can be assigned utilizing a frame counter. The reference number can be assigned independent of the start of packet. In accordance with some aspects, assigning the reference number includes choosing a next reference number in a cycle of reference numbers. The cycle of reference numbers might not be sequential numbers and/or might not reset at a start of packet.

At 1306 the encoded data packet is modulated. Modulation can be performed employing a modulation technique, such as frequency, phase or amplitude modulation, for example. After modulation, the encoded data packet is transmitted over the network, at 1308.

Once the data packet has been successfully decoded by a receiver, an ACK signal can be received. The receiver can also utilize negative acknowledgements (NACK) signals to feedback information to the transmitter. In accordance with some aspects, a decision can be made whether an ACK signal was received, indicating that the packet was successful decoded at the receiving end and, thus, a new packet can be encoded at 1302. If an ACK signal is not received, it can indicate unsuccessful decoding of the data packet at the receiving end and a reference number can be reassigned at 1304 and the data packet can be resent until an ACK is received in response to the transmission.

Figure 14:
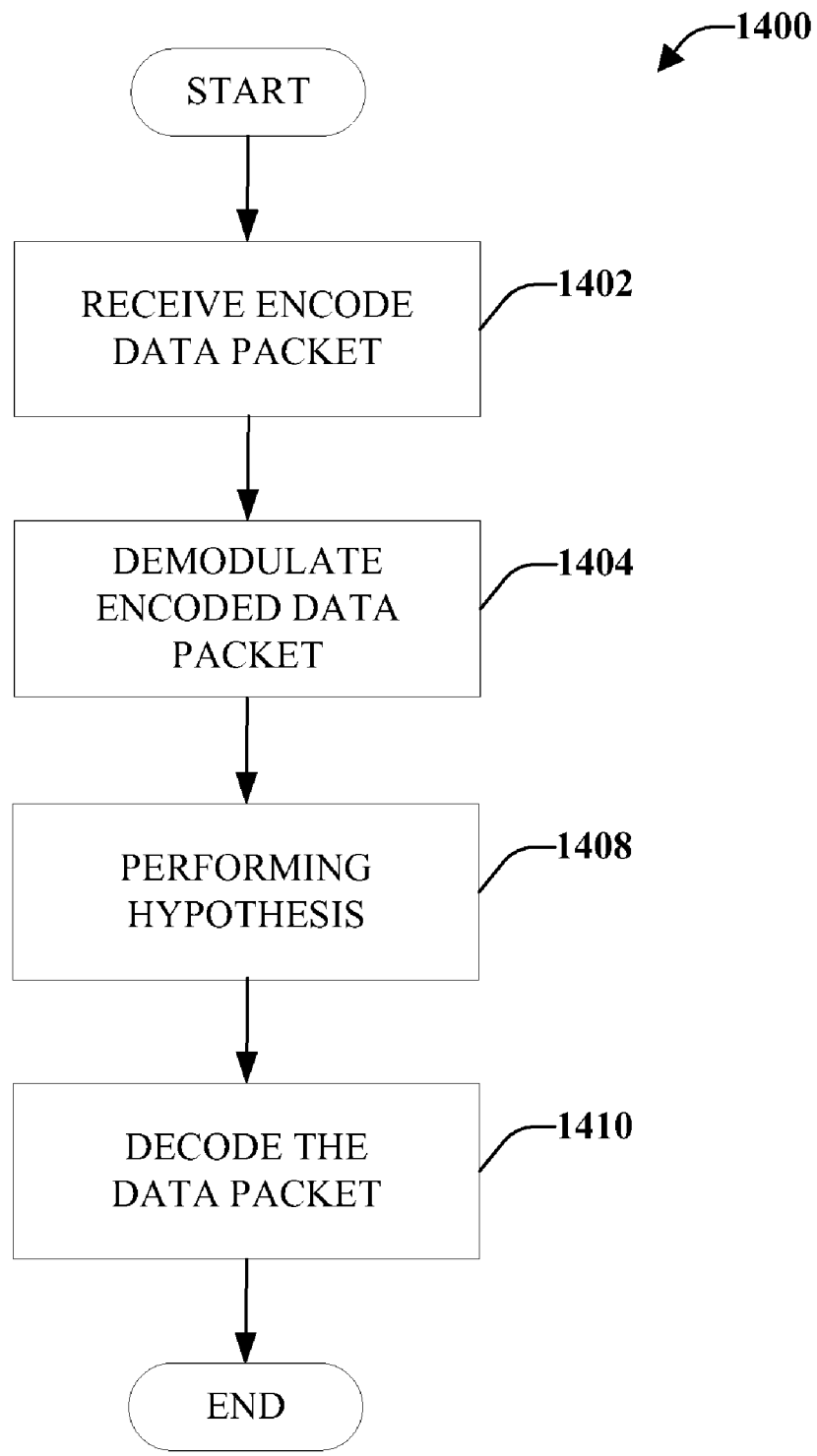
FIG. 14 illustrates a method for receiving a data packet employing a Hybrid-ARQ protocol over a network.

FIG. 14 illustrates a method 1400 for receiving a data packet employing a Hybrid-ARQ protocol over a network. An encoded data packet transmitted over a network is received at 1402. The encoded data packet can include a reference number. The reference number can be independent of the start of packet location. In accordance with some aspects, the reference number is not a sequential number. The reference number can correspond with a pre-determined H-ARQ alignment.

At 1404, the encoded data packet is demodulated. The packet can be demodulated utilizing a modulated technique employed at the transmitted end (e.g., the modulation technique utilized to modulate the encoded data packet). At 1406, a hypothesis is performed based in part on the reference number. The hypothesis can be a single hypothesis of SOP-asynchronous H-ARQ. At 1408, the encoded data packet is decoded.

A decision can be made whether the decoding is successful. If the decoding is successful, an ACK signal can be sent to the transmitting end over the network. At substantially the same time as the ACK signal is sent, or some time thereafter, new data signals can be received at 1402. If the decoding is unsuccessful, an ACK signal is not sent and another attempt is made to decode retransmissions received, at 1402. In accordance with some aspects, negative acknowledgements (NACK) signals can be utilized to feedback information to the transmitting end.

Figure 15:
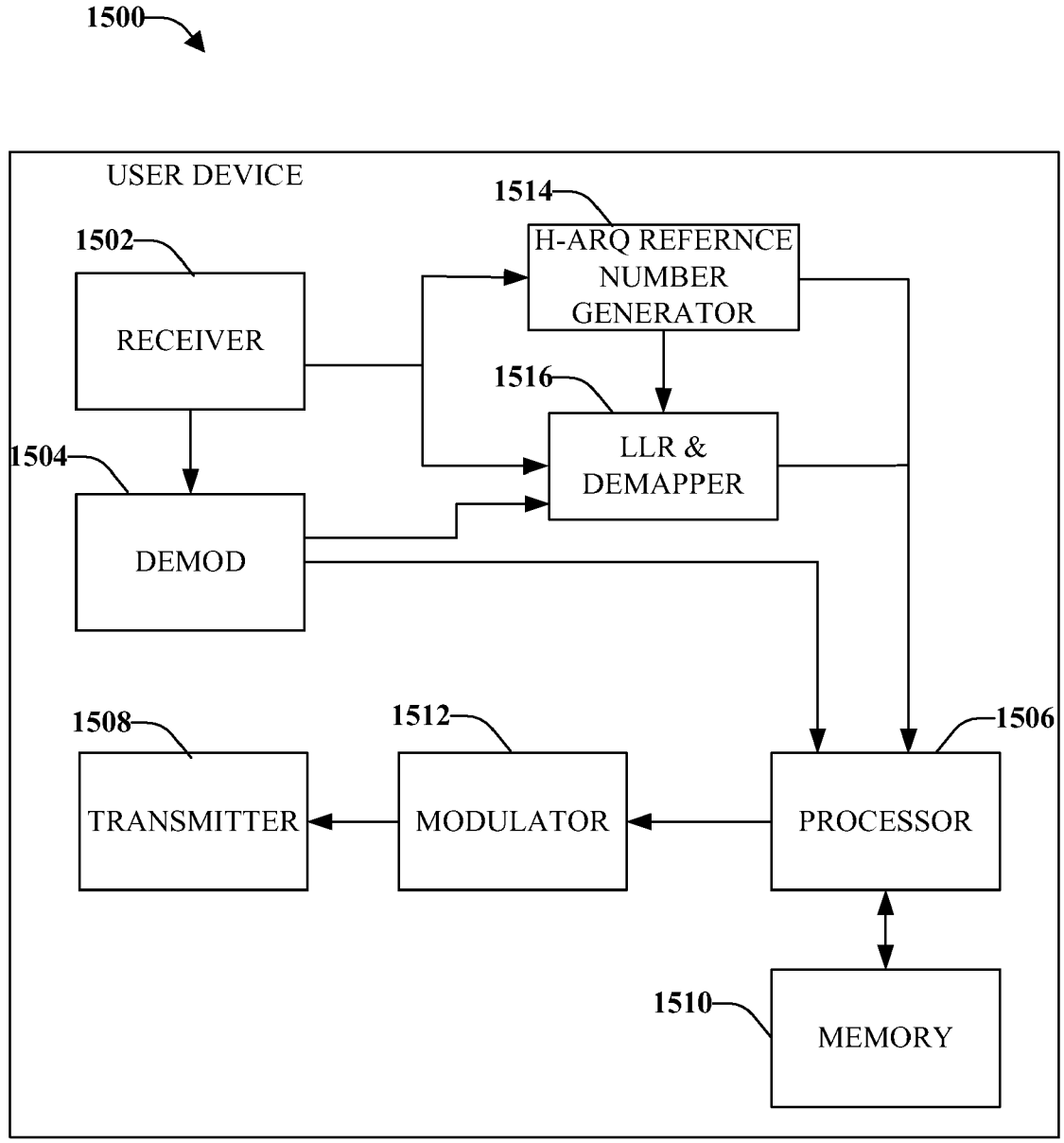
FIG. 15 illustrates a system that facilitates receiving a data packet employing a Hybrid-ARQ protocol in accordance with one or more of the disclosed aspects.

With reference now to FIG. 15, illustrated is a system 1500 that facilitates receiving a data packet employing a Hybrid-ARQ protocol in accordance with one or more of the disclosed aspects. System 1500 can reside in a user device. System 1500 comprises a receiver 1502 that can receive a signal from, for example, a receiver antenna. The receiver 1502 can perform typical actions thereon, such as filtering, amplifying, downconverting, etc. the received signal. The receiver 1502 can also digitize the conditioned signal to obtain samples. A demodulator 1504 can obtain received symbols for each symbol period, as well as provide received symbols to a processor 1506.

Processor 1506 can be a processor dedicated to analyzing information received by receiver component 1502 and/or generating information for transmission by a transmitter 1508. In addition or alternatively, processor 1506 can control one or more components of user device 1500, analyze information received by receiver 1502, generate information for transmission by transmitter 1508, and/or control one or more components of user device 1500. Processor 1506 may include a controller component capable of coordinating communications with additional user devices.

User device 1500 can additionally comprise memory 1508 operatively coupled to processor 1506 and that can store information related to coordinating communications and any other suitable information. Memory 1510 can additionally store protocols associated with sample rearrangement. It will be appreciated that the data store (e.g., memories) components described herein can be either volatile memory or non-volatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1508 of the subject systems and/or methods is intended to comprise, without being limited to, these and any other suitable types of memory. User device 1500 can further comprise a symbol modulator 1512 and a transmitter 1508 that transmits the modulated signal.

Receiver 1502 is further operatively coupled to a H-ARQ Reference Number Generator 1514 that can be configured to utilize a frame counter (not shown) to generate references numbers for the encoded data packet on the receiver side. The H-ARQ Reference Number Generator can utilize information from a frame counter (not shown) to generate the references numbers. Additionally, receiver 1502 can be operatively coupled to an LLR and demapper 1516 that can be configured to improve error rate performance by combining retransmission bits based on Log Likelihood Ratio (LLR) of each bit of the demodulated data symbols in user device 1500.

Figure 16:
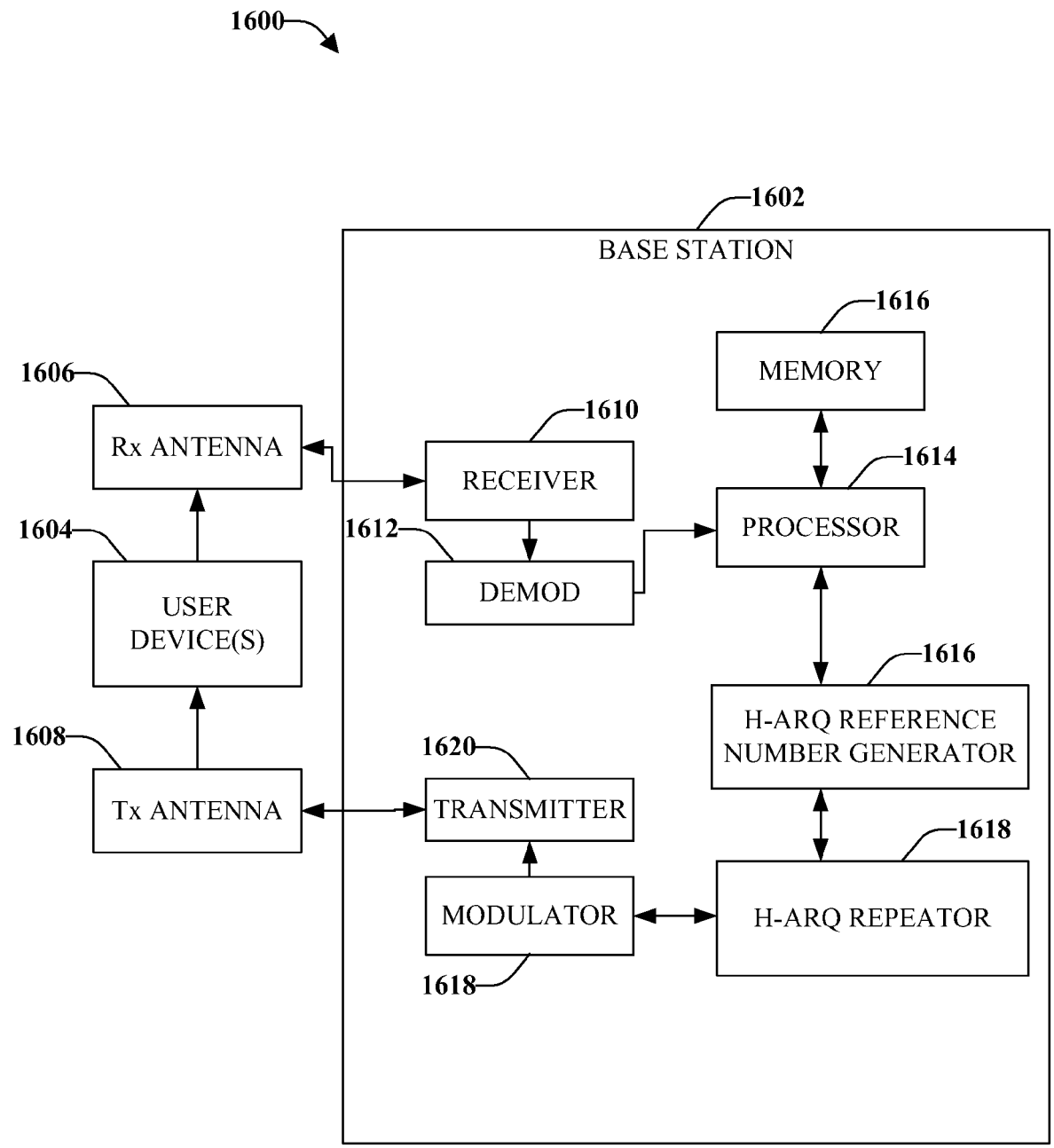
FIG. 16 illustrates a system that facilitates transmitting a data packet employing a Hybrid-ARQ protocol in accordance with various aspects presented herein.

FIG. 16 is an illustration of a system 1600 that facilitates transmitting a data packet employing a Hybrid-ARQ protocol in accordance with various aspects presented herein. System 1600 comprises a base station or access point 1602. As illustrated, base station 1602 receives signal(s) from one or more user devices 1604 by a receive antenna 1606, and transmits to the one or more user devices 1604 through a transmit antenna 1608.

Base station 1602 comprises a receiver 1610 that receives information from receive antenna 1606 and is operatively associated with a demodulator 1612 that demodulates received information. Demodulated symbols are analyzed by a processor 1614 that is coupled to a memory 1616 that stores information related to broadcast-multicast waveforms embedded in a unicast waveform. A modulator 1618 can multiplex the signal for transmission by a transmitter 1620 through transmit antenna 1608 to user devices 1604.

Processor 1614 is further coupled to H-ARQ Transmission Generator 1616. Transmission of an encoded packet ready for mapping and modulation can start anywhere based on a reference number obtained from the H-ARQ reference number generator 16161, which can utilize a frame counter (not shown) to generate transmission numbers for the encoded data packet. Also included can be a H-ARQ Data Repeator 1618 that can employ the encoded data packet for retransmissions, if necessary.

Figure 17:
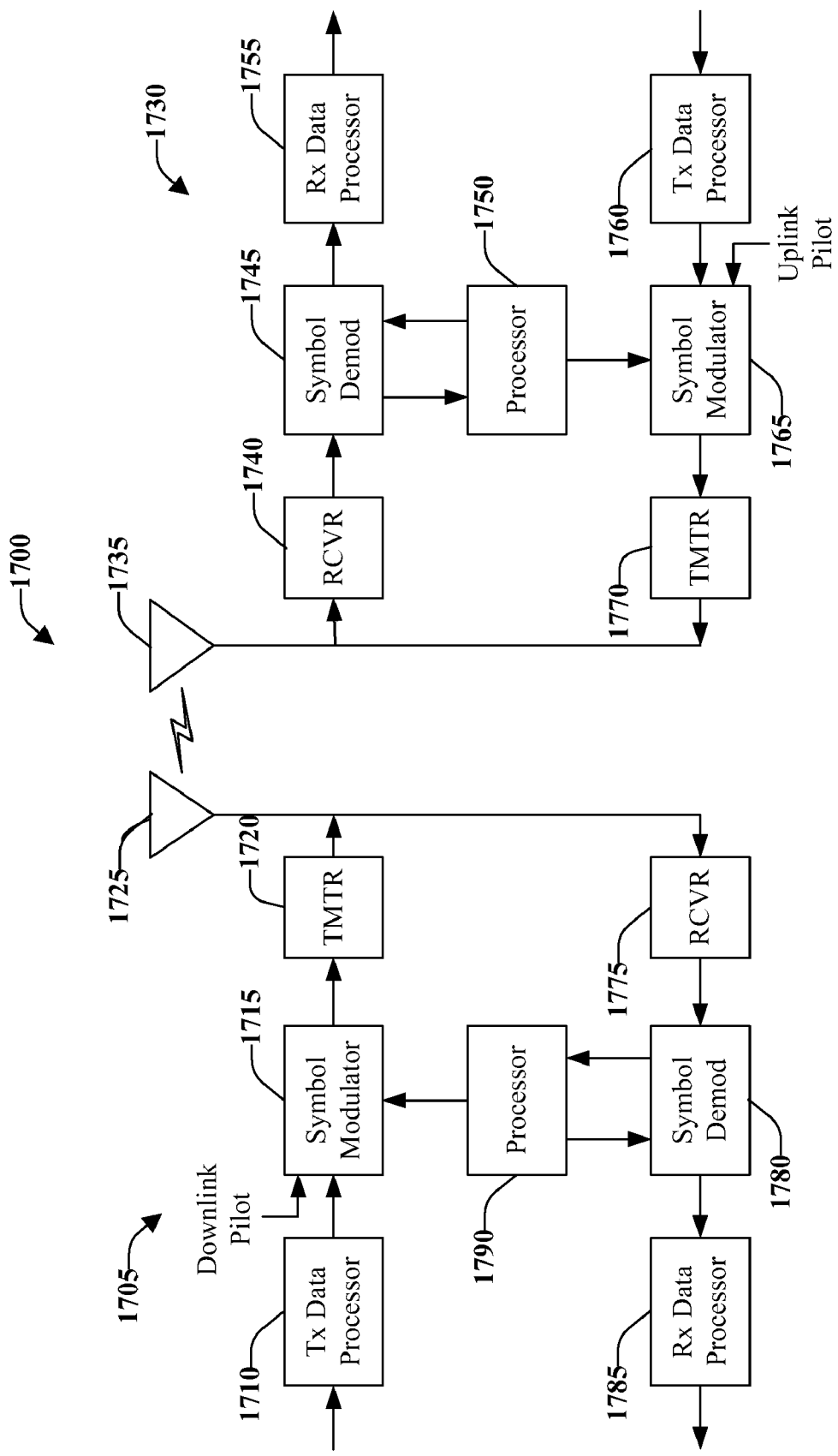
FIG. 17 illustrates an exemplary wireless communication system.

FIG. 17 illustrates an exemplary wireless communication system 1700. Wireless communication system 1700 depicts one base station and one terminal for sake of brevity. However, it is to be appreciated that system 1700 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 17, on a downlink, at access point 1705, a transmit (TX) data processor 1710 receives, formats, codes, interleaves, and modulates (or symbol maps) traffic data and provides modulation symbols ("data symbols"). A symbol modulator 1715 receives and processes the data symbols and pilot symbols and provides a stream of symbols. A symbol modulator 1715 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1720 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1725 to the terminals. At terminal 1730, an antenna 1735 receives the downlink signal and provides a received signal to a receiver unit (RCVR) 1740. Receiver unit 1740 conditions (e.g., filters, amplifies, and frequency downconverts) the received signal and digitizes the conditioned signal to obtain samples. A symbol demodulator 1745 obtains N received symbols and provides received pilot symbols to a processor 1750 for channel estimation. Symbol demodulator 1745 further receives a frequency response estimate for the downlink from processor 1750, performs data demodulation on the received data symbols to obtain data symbol estimates (which are estimates of the transmitted data symbols), and provides the data symbol estimates to an RX data processor 1755, which demodulates (i.e., symbol demaps), deinterleaves, and decodes the data symbol estimates to recover the transmitted traffic data. The processing by symbol demodulator 1745 and RX data processor 1755 is complementary to the processing by symbol modulator 1715 and TX data processor 1710, respectively, at access point 1705.

On the uplink, a TX data processor 1760 processes traffic data and provides data symbols. A symbol modulator 1765 receives and multiplexes the data symbols with pilot symbols, performs modulation, and provides a stream of symbols. A transmitter unit 1770 then receives and processes the stream of symbols to generate an uplink signal, which is transmitted by the antenna 1735 to the access point 1705.

At access point 1705, the uplink signal from terminal 1730 is received by the antenna 1725 and processed by a receiver unit 1775 to obtain samples. A symbol demodulator 1780 then processes the samples and provides received pilot symbols and data symbol estimates for the uplink. An RX data processor 1785 processes the data symbol estimates to recover the traffic data transmitted by terminal 1730. A processor 1790 performs channel estimation for each active terminal transmitting on the uplink.

Processors 1790 and 1750 direct (e.g., control, coordinate, manage, . . . ) operation at access point 1705 and terminal 1730, respectively. Respective processors 1790 and 1750 can be associated with memory units (not shown) that store program codes and data. Processors 1790 and 1750 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1790 and 1750.

Figure 18:
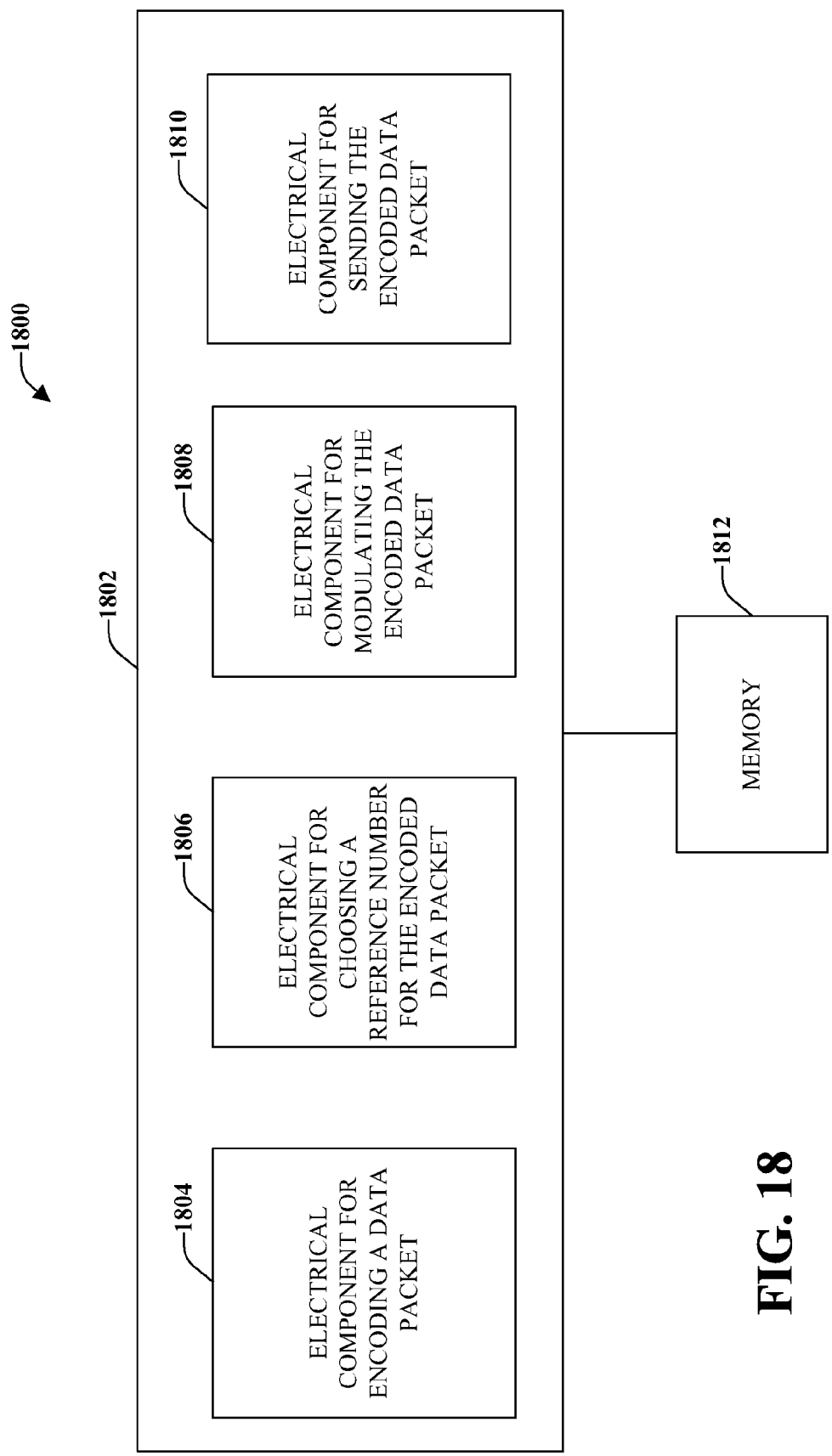
FIG. 18 illustrates an example system that employs a Hybrid-ARQ protocol.

With reference to FIG. 18, illustrated is an example system 1800 that employs a Hybrid-ARQ protocol. For example, system 1800 may reside at least partially within a base station. It is to be appreciated that system 1800 is represented as including functional blocks, which may be functional blocks that represent functions implemented by a processor, software, or combination thereof (e.g., firmware).

System 1800 includes a logical grouping 1802 of electrical components that can act separately or in conjunction. For instance, logical grouping 1802 can include an electrical component for encoding a data packet 1804. Logical grouping 1802 can also include an electrical component for choosing a reference number for the encoded data packet 1806. Electrical component 1806 can choose the reference number by selecting a next reference number in a cycle of numbers. In accordance with some aspects, the cycle of numbers are not sequential numbers. In accordance with other aspects, the cycle of numbers are sequential numbers. Electrical component 1806 can choose the reference number independent of a start of packet location. Further, logical grouping 1802 can comprise an electrical component for modulating the encoded data packet 1808 and an electrical component for sending the encoded data packet over a network after modulation 1810.

In accordance with some aspects, logical grouping 1802 can include an electrical component for generating a plurality of reference numbers (not shown). The reference numbers can repeat over time.

In accordance with some aspects, logical grouping 1802 includes an electrical component for determining if an ACK signal is received in reply to the transmitted encoded data packet. If an ACK signal is received, the electrical component for encoding a data packet 1804 encodes a next data packet. The electrical component for modulating 1808 can modulate the next encoded data packet and the electrical component for sending 1810 transmits the next encoded data packet over the network.

In accordance with some aspects, logical grouping 1802 includes an electrical component for determining if an ACK signal is received in reply to the transmitted encoded data packet. If an ACK signal is not received, the electrical component for choosing a reference number 1806 assigns another reference number to the encoded data packet. The electrical component for modulating the encoded data packet 1808 modulates the encoded data packet with the next reference number and the electrical component for sending the encoded data packet 1810 transmits the data packet with the next reference number over the network after modulation.

Additionally, system 1800 can include a memory 1812 that retains instructions for executing functions associated with electrical components 1804, 1806, 1808, and 1810 or other components. While shown as being external to memory 1812, it is to be understood that one or more of electrical components 1804, 1806, 1808, and 1810 may exist within memory 1812.

Figure 19:
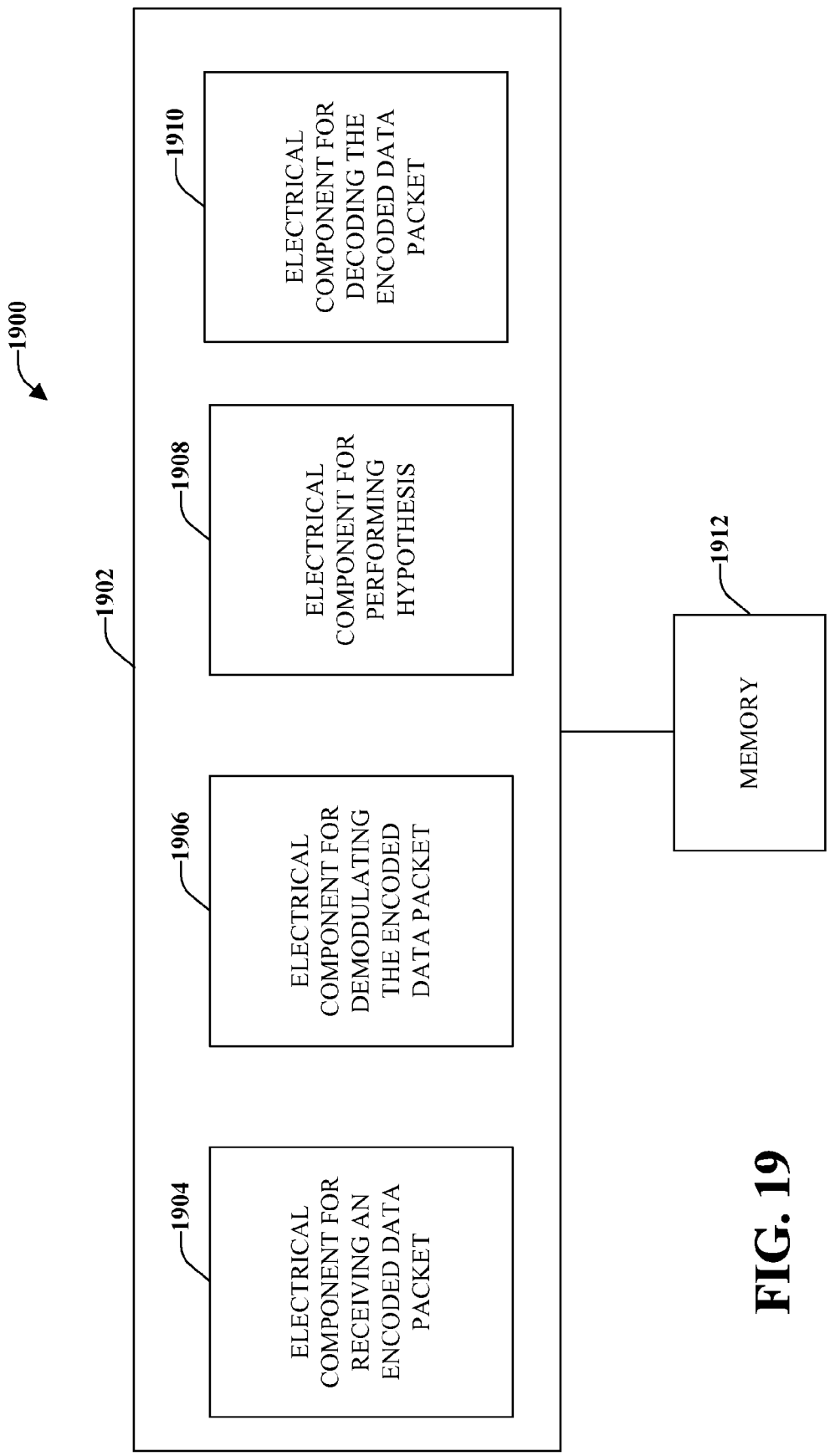
FIG. 19 illustrates an example system that employs a Hybrid-ARQ protocol.

With reference to FIG. 19, illustrated is an example system 1900 that employs a Hybrid-ARQ protocol. System 1900 may reside at least partially within a mobile device. It is to be appreciated that system 1900 is represented as including functional blocks, which may be functional blocks that represent functions implemented by a processor, software, or combination thereof (e.g., firmware).

System 1900 includes a logical grouping 1902 of electrical components that can act separately or in conjunction. For instance, logical grouping 1902 may include an electrical component for receiving an encoded data packet transmitted over a network 1904. The encoded data packet can include a reference number. The reference number can be independent of the start of packet location. In accordance with some aspects, the reference number is not a sequential number. In accordance with other aspects the reference number is a sequential number. The reference number can correspond with a pre-determined alignment.

Further, logical grouping 1902 can comprise an electrical component for demodulating the encoded data packet 1906. Demodulating the encoded data packet can be performed based on a modulation technique used to modulate the encoded data packet. Also included is an electrical component for performing hypothesis based upon the reference number 1908. An electrical component for decoding the encoded data packet 1910 is also included in logical grouping 1902.

In accordance with some aspects, logical grouping 1902 can further include an electrical component for determining if the data packet was decoded successfully. Also included is an electrical component for sending an ACK signal if the data packet was decoded successfully and an electrical component for receiving another encoded data packet.

In accordance with some aspects, logical grouping 1902 can further include an electrical component for determining if the data packet was decoded successfully. An electrical component for sending an NACK signal can send the NACK signal if the data packet was not successfully decoded. Also included in logical grouping 1902 can be an electrical component for attempting to decode a retransmission received over the network.

Additionally, system 1900 can include a memory 1912 that retains instructions for executing functions associated with electrical components 1904, 1906, 1908, and 1910 or other components. While shown as being external to memory 1912, it is to be understood that one or more of electrical components 1904, 1906, 1908, and 1910 may exist within memory 1912.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for transmitting a data packet employing a Hybrid-ARQ protocol over a network, comprising:
   encoding a data packet;
   assigning a reference number to the encoded data packet;
   modulating the encoded data packet; and
   transmitting the encoded data packet over the network after modulation,
   wherein said assigning the reference number comprises choosing a next reference number in a cycle of numbers, and
   wherein the cycle of numbers are not an uninterrupted sequence of consecutive numbers.

2. The method of claim 1, wherein assigning the reference number is independent of a start of packet.

3. The method of claim 1, wherein the cycle of numbers does not reset at a start of packet.

4. The method of claim 1, further comprising:
   determining if an ACK signal is received in reply to the transmitted encoded data packet;
   encoding another data packet for transmission; modulating the another encoded data packet; and
   transmitting the another encoded data packet over the network after modulation, if an ACK signal is received.

5. The method of claim 1, further comprising:
   determining if an ACK signal is received in reply to the transmitted encoded data packet;
   assigning a next reference number to the encoded data packet;
   modulating the encoded data packet with the next reference number; and
   transmitting the encoded data packet with the next reference number over the network after modulation, if an ACK signal is not received.

6. A wireless communications apparatus, comprising:
   a memory that retains instructions related to encoding a data packet, assigning a
   reference number to the encoded data packet, modulating the encoded data packet, and
   communicating the encoded data packet over the air after modulation; and
   a processor, coupled to the memory, configured to execute the instructions retained in the memory,
   wherein said assigning the reference number comprises choosing a next reference number in a cycle of numbers, and
   wherein the cycle of numbers are not an uninterrupted sequence of consecutive numbers.

7. The wireless communications apparatus of claim 6, wherein the memory further retains instructions related to generating a plurality of reference numbers that repeat over time, the assigned reference number is one of the plurality of reference numbers.

8. The wireless communication apparatus of claim 7, wherein the memory further retains instructions related to assigning a next reference number from the plurality of references numbers for a second encoded data packet.

9. The wireless communications apparatus of claim 6, wherein the plurality of reference numbers does not reset at a start of packet.

10. The wireless communications apparatus of claim 6, wherein assigning the reference number to the encoded data packet is independent of a start of packet location.

11. The wireless communications apparatus of claim 6, the memory further retains instructions related to determining if an ACK signal is received in reply to the transmitted encoded data packet, encoding another data packet for transmission, modulating the another encoded data packet, and transmitting the another encoded data packet over the network after modulation if an ACK signal is received.

12. The wireless communications apparatus of claim 6, the memory further retains instructions related to determining if an ACK signal is received in reply to the transmitted encoded data packet, assigning a next reference number to the encoded data packet, modulating the encoded data packet with the next reference number, and transmitting the encoded data packet with the next reference number over the network after modulation if an ACK signal is not received.

13. A wireless communications apparatus that employs a Hybrid-ARQ protocol, comprising:
   means for encoding a data packet;
   means for choosing a reference number for the encoded data packet and for selecting a next reference number in a cycle of numbers;
   means for modulating the encoded data packet; and
   means for sending the encoded data packet over a network after modulation,
   wherein the cycle of numbers are not an uninterrupted sequence of consecutive numbers.

14. The wireless communications apparatus of 13, further comprising: means for generating a plurality of reference numbers, wherein the reference numbers repeat over time.

15. The wireless communications apparatus of claim 13, wherein the means for choosing a reference number selects the reference number independent of a start of packet location.

16. The wireless communications apparatus of claim 13, further comprising:
   means for determining if an ACK signal is received in reply to the transmitted encoded data packet;
   wherein the means for encoding a data packet for transmission encodes a next data packet, the means for modulating modulates the next encoded data packet and the means for sending transmits the next encoded data packet over the network after modulation if an ACK signal is received.

17. The wireless communications apparatus of claim 13, further comprising:
   means for determining if an ACK signal is received in reply to the transmitted encoded data packet;
   wherein the means for choosing a reference number assigns another reference number to the encoded data packet, the means for modulating the encoded data packet modulates the encoded data packet with the next reference number and the means for sending the encoded data packet transmits the data packet with the next reference number over the network after modulation if an ACK signal is not received.

18. A non-transitory machine-readable medium having stored thereon machine-executable instructions for: encoding a data packet; assigning a reference number to the encoded data packet; modulating the encoded data packet; and transmitting the encoded data packet over the network after modulation, wherein said assigning the reference number comprises choosing a next reference number in a cycle of numbers, and wherein the cycle of numbers are not an uninterrupted sequence of consecutive numbers.

19. In a wireless communications system, an apparatus comprising: a processor configured to:

retain instructions related to encoding a data packet;
assign a reference number to the encoded data packet independent of a start of packet;
modulate the encoded data packet; and
communicate the encoded data packet over the air after modulation,
wherein the reference number is one of a cycle of numbers that are not an uninterrupted sequence of consecutive numbers.

20. A method for receiving a data packet employing a Hybrid-ARQ protocol over a network, comprising:

receiving an encoded data packet transmitted over a network, the encoded data packet includes a reference number;
demodulating the encoded data packet;
performing hypothesis based upon the reference number; and
decoding the encoded data packet.

21. The method of claim 20, wherein the reference number is independent of the start of packet location.

22. The method of claim 20, wherein the reference number is not a sequential number.

23. The method of claim 20, wherein the reference number corresponds with a pre-determined alignment.

24. The method of claim 20, wherein demodulating the encoded data packet is performed based on a modulation technique used to modulate the encoded data packet.

25. The method of claim 20, further comprising: determining if the data packet was decoded successfully; sending an ACK signal if the data packet was decoded successfully; and receiving another encoded data packet.

26. The method of claim 20, further comprising:
determining if the data packet was decoded successfully;
sending an NACK signal; and
attempting to decode a retransmission received over the network.

27. A wireless communications apparatus, comprising:
a memory that retains instructions related to receiving an encoded data packet transmitted over a network, the encoded data packet includes a reference number, demodulating the encoded data packet, performing hypothesis based upon the reference number and decoding the encoded data packet; and
a processor, coupled to the memory, configured to execute the instructions retained in the memory.

28. The wireless communications apparatus of claim 27, wherein the reference number is independent of the start of packet location.

29. The wireless communications apparatus of claim 27, wherein the reference number is not a sequential number.

30. The wireless communications apparatus of claim 27, wherein the reference number corresponds with a pre-determined alignment.

31. The wireless communications apparatus of claim 27, wherein demodulating the encoded data packet is performed based on a modulation technique used to modulate the encoded data packet.

32. The wireless communications apparatus of claim 27, the memory further retains instructions relating to determining if the data packet was decoded successfully, sending an ACK signal if the data packet was decoded successfully, and receiving another encoded data packet.

33. The wireless communications apparatus of claim 27, the memory further retains instructions relating to determining if the data packet was decoded successfully, sending an NACK signal, and attempting to decode a retransmission received over the network.

34. A wireless communications apparatus that employs a Hybrid-ARQ protocol, comprising:
means for receiving an encoded data packet transmitted over a network, the encoded data packet includes a reference number; means for demodulating the encoded data packet;
means for performing hypothesis based upon the reference number; and
means for decoding the encoded data packet.

35. The wireless communications apparatus of claim 34, wherein the reference number is independent of the start of packet location.

36. The wireless communications apparatus of claim 34, wherein the reference number is not a sequential number.

37. The wireless communications apparatus of claim 34, wherein the reference number corresponds with a pre-determined alignment.

38. The wireless communications apparatus of claim 34, wherein demodulating the encoded data packet is performed based on a modulation technique used to modulate the encoded data packet.

39. The wireless communications apparatus of claim 34, further comprising:
means for determining if the data packet was decoded successfully;
means for sending an ACK signal if the data packet was decoded successfully; and
means for receiving another encoded data packet.

40. The wireless communications apparatus of claim 34, further comprising:
means for determining if the data packet was decoded successfully;
means for sending an NACK signal; and
means for attempting to decode a retransmission received over the network.

41. A non-transitory machine-readable medium having stored thereon machine-executable instructions for:
receiving an encoded data packet transmitted over a network, the encoded data packet includes a reference number; demodulating the encoded data packet;
performing hypothesis based upon the reference number; and
decoding the encoded data packet.

42. The non-transitory machine-readable medium of claim 41, wherein the reference number is independent of a start of packet.

43. In a wireless communications system, an apparatus comprising: a processor configured to:
receive an encoded data packet transmitted over a network, the encoded data packet includes a reference number;
demodulate the encoded data packet;
perform hypothesis based upon the reference number; and
decoding the encoded data packet.

* * * * *